(12) United States Patent
Suzuki et al.

(10) Patent No.: US 6,677,083 B2
(45) Date of Patent: Jan. 13, 2004

(54) SEPARATOR, GELATED ELECTROLYTE, NON-AQUEOUS ELECTROLYTE, ELECTRODE AND NON-AQUEOUS ELECTROLYTE CELL EMPLOYING THE SAME

(75) Inventors: Yusuke Suzuki, Miyagi (JP); Mashio Shibuya, Miyagi (JP); Tomitaro Hara, Miyagi (JP)

(73) Assignee: Sony Corporation, Tokyo (JP)

( * ) Notice: Subject to any disclaimer, the term of this patent is extended or adjusted under 35 U.S.C. 154(b) by 319 days.

(21) Appl. No.: 09/822,069

(22) Filed: Mar. 30, 2001

(65) Prior Publication Data

US 2002/0018936 A1 Feb. 14, 2002

(30) Foreign Application Priority Data

| Mar. 31, 2000 | (JP) | P2000-101355 |
| Mar. 31, 2000 | (JP) | P2000-101356 |
| Mar. 31, 2000 | (JP) | P2000-101357 |
| Mar. 31, 2000 | (JP) | P2000-101358 |

(51) Int. Cl.$^7$ ................................................. H01M 6/14
(52) U.S. Cl. ................. 429/300; 429/231.95; 429/247; 429/248; 429/251; 429/122; 429/129
(58) Field of Search ................................ 429/122, 129, 429/300, 231.95, 247, 248, 251

(56) References Cited

U.S. PATENT DOCUMENTS

| 5,141,827 A | 8/1992 | Fritz | 429/191 |
| 5,168,019 A | 12/1992 | Sugeno | 429/194 |
| 5,389,471 A | 2/1995 | Kung | 429/206 |
| 5,728,482 A | 3/1998 | Kawakami | 429/10 |

FOREIGN PATENT DOCUMENTS

| DE | 19546333 | 6/1996 |
| EP | 0747982 | 12/1996 |
| EP | 0834936 | 4/1998 |
| JP | 54-116644 | 9/1979 |
| JP | 59-009874 | 1/1984 |
| JP | 63 224147 | 1/1989 |
| JP | 07-153496 | 6/1995 |
| JP | 10-241665 | 9/1998 |
| JP | 11-097286 | 9/1999 |
| WO | WO 98 34289 | 8/1998 |
| WO | WO 99 39554 | 8/1999 |

OTHER PUBLICATIONS

"Enhanced Lithium–ion transport in PEO–based Composite Polymer Electrolyte with Ferroelectric BaTiO3", H. Y. Sun et al; Jul. 26, 1999—Chemical Abstracts, vol. 131, No. 4, Journal of the Electrochemical Society—pp. 1672–1676.

Primary Examiner—Bruce F. Bell
(74) Attorney, Agent, or Firm—Sonnenschein, Nath & Rosenthal LLP

(57) ABSTRACT

An inorganic compound with a specific inductive capacity not less than 12, is contained in a separator, a gelated electrolyte, a non-aqueous electrolyte, and an electrode. This improves the degree of ion dissociation of a lithium compound as an electrolytic salt contained in the non-aqueous solvent, the gelated electrolyte, and the electrolytic salt, while diminishing resistance against ion conduction to improve ion conductivity and while preventing crystallization in a low-temperature environment.

18 Claims, 3 Drawing Sheets

SEPARATOR, GELATED ELECTROLYTE, NON-AQUEOUS ELECTROLYTE, ELECTRODE AND NON-AQUEOUS ELECTROLYTE CELL EMPLOYING THE SAME

RELATED APPLICATION DATA

The present application claims priority to Japanese Applications Nos. P2000-101355 filed Mar. 31, 2000, P2000-101356 filed Mar. 31, 2000, P2000-101357 filed Mar. 31, 2000, and P2000-101358 filed Mar. 31, 2000, which applications are incorporated herein by reference to the extent permitted by law.

BACKGROUND OF THE INVENTION

This invention relates to a separator used for a cell and, more particularly, to a non-aqueous electrolyte cell employing the separator. This invention also relates to a gelated electrolyte obtained on gelating the non-aqueous electrolyte, a non-aqueous electrolyte cell employing this non-aqueous electrolyte, a non-aqueous electrolyte used for a cell, a non-aqueous electrolyte cell employing the non-aqueous electrolyte, an electrode used in a cell and to a non-aqueous electrolyte cell employing this electrode.

Heretofore, a nickel-cadmium cell and a lead cell have been in use as a secondary cell for electronic equipment. Recently, with the progress in the electronic technology, the electronic equipment is reduced in size and improved in portability. In keeping pace theewith, a demand is raised for a higher energy density of the secondary cell for electronic equipment. However, the discharge capacity is low in the nickel-cadmium cell or lead cell, such that it is not possible to raise the energy density sufficiently.

Under these circumstances, researches are being conducted briskly in the field of the so-called non-aqueous electrolyte cell. This non-aqueous electrolyte cell features a high discharge voltage and lightness in weight.

Among known non-aqueous electrolyte cells, there are a lithium cell exploiting lithium dissolution and precipitation and a lithium ion cell exploiting doping/undoping of lithium ions. In these cells, conductivity of lithium ions play a significant role in the cell performance.

Thus, for realizing a cell having a high capacity and superior load, low-temperature and cyclic characteristics, it is crucial how the ion conductivity in the cell system of the non-aqueous electrolyte cell is to be improved.

So, in e.g., a non-aqueous electrolyte of the non-aqueous electrolyte cell, it is contemplated to raise the ionic conductivity, such as by employing carbonate-based or an ether-based non-aqueous solvent, having high chemical and electrical stability and a high dielectric constant, and by employing an imide-based lithium salt, having a degree of dissociation higher than that of routine $LiPF_6$ or $LiBF_4$, as an electrolytic salt.

On the other hand, if lithium ions are to be migrated between the positive and negative electrodes, the lithium ions need to be transmitted through a separator, which is known to be generally lower in ionic conductivity than the electrolyte.

For reducing the resistance of the separator to ionic conduction, it may be contemplated to increase the porosity or to reduce the film thickness.

However, in a separator in which ionic conductivity is improved by these methods, there are raised problems as to functions as the diaphragms of the positive and negative electrodes, mechanical or thermal strength or uniformity in the film thickness. Thus, these methods may not be said to be optimum.

On the other hand, if a gelated electrolyte is prepared by the combination of the routine solvent and the electrolytic salt, ionic conductivity cannot be optimum.

Moreover, if the non-aqueous electrolyte cell is produced by the combination of the routine solvent and the electrolytic salt, ionic conductivity is not sufficient. Thus, it is not that easy to provide a non-aqueous electrolyte cell which is superior in capacity, cyclic service life, heavy load characteristics and in low-temperature characteristics.

Also, if the non-aqueous electrolyte cell having a high energy density is to be realized, it is necessary to increase the capacity of the active material in the electrodes as well as to increase the amount of the non-aqueous electrolyte enclosed in the cell. In general, the non-aqueous electrolyte cell is made up of the separator and the current collector in addition to the active material. Since these components are not pertinent to charging/discharging, the volume of these components in the non-aqueous electrolyte cell is desirably as small as possible if the non-aqueous electrolyte cell is to be of high energy density.

For decreasing the volume of the separator and the current collector, the thickness of the active material may be reduced to as small a value as possible, with the electrode area being then as small as possible. However, in a well-known manner, the thick thickness of the active material leads to lowered load characteristics. If a method for producing the non-aqueous electrolyte cell or the electrode is to be optimum, it cannot be advisable to increase the thickness of the active material as high load characteristics are maintained.

SUMMARY OF THE INVENTION

It is therefore an object of the present invention to provide a separator having high ion conductivity and a non-aqueous electrolyte cell superior in capacity, cyclic durability, load characteristics and in low-temperature characteristics.

It is another object of the present invention to provide a gelated electrolyte having optimum ion conductivity and a non-aqueous electrolyte cell superior in capacity, cyclic durability, load characteristics and in low-temperature characteristics.

It is a further object of the present invention to provide a non-aqueous electrolyte having optimum ion conductivity, and a non-aqueous electrolyte cell superior in capacity, cyclic durability, load characteristics and in low-temperature characteristics.

It is yet another object of the present invention to provide an electrode which, when applied to a non-aqueous electrolyte cell, has high load characteristics, and a non-aqueous electrolyte cell having high load characteristics even if the active material is formed to a thick thickness.

In one aspect, the present invention provides a separator containing an inorganic compound having a specific inductive capacity not lower than 12.

In another aspect, the present invention provides a non-aqueous electrolyte cell including a negative electrode, a positive electrode, a non-aqueous electrolyte and a separator, wherein the separator contains an inorganic compound having a specific inductive capacity not lower than 12.

The inorganic compound exhibiting dielectric properties, added to the separator, improves the degree of dissociation of the electrolytic salt (lithium salt) impregnated into separator pores or existing in the vicinity of the separator.

The result is the decreased resistance of the lithium ions of the separator against ionic conduction and improved ionic conductivity.

Since there is no necessity of enlarging the porosity of the separator or forming the separator as a thin film, the function of the separator as a diaphragm between the positive and negative electrodes, mechanical strength and thermal strength can be achieved sufficiently.

So, in the non-aqueous electrolyte cell employing the separator, lithium ion migration between the positive and negative electrodes occurs smoothly to decrease the internal impedance to realize superior load and low-temperature characteristics. Moreover, if the ionic conductivity of the lithium ions is improved, the cyclic properties of the non-aqueous electrolyte cell are improved simultaneously.

In still another aspect, the present invention provides a gelated electrolyte obtained on gelating a non-aqueous electrolyte solution obtained in turn on dissolving an Li-containing electrolyte salt in a non-aqueous solvent, wherein the gelated electrolyte contains an inorganic compound having a specific inductive capacity not lower than 12.

In still another aspect, the present invention provides a non-aqueous electrolyte cell including a negative electrode, a positive electrode and a gelated electrolyte, a gelated electrolyte containing an inorganic compound having a specific inductive capacity not lower than 12.

The inorganic compound, exhibiting dielectric properties, added to the gelated electrolyte, improves the degree of dissociation of the electrolytic salt (lithium salt) in the gelated electrolyte. The result is the significantly improved ionic conductivity in the gelated electrolyte.

So, in the non-aqueous electrolyte cell, employing this gelated electrolyte, lithium ion migration between the positive and negative electrodes occurs smoothly to decrease the internal impedance to realize superior load and low-temperature characteristics. Moreover, if the ionic conductivity of the lithium ions is improved, the cyclic properties of the non-aqueous electrolyte cell are improved simultaneously.

In still another aspect, the present invention provides a non-aqueous electrolyte containing a non-aqueous solvent, an Li-containing electrolytic salt and an inorganic compound having a specific inductive capacity not lower than 12.

In still another aspect, the present invention provides a non-aqueous electrolyte cell comprising negative electrode, a positive electrode and a gelated electrolyte, with the gelated electrolyte containing an inorganic compound having a specific inductive capacity not lower than 12.

The inorganic compound, exhibiting dielectric properties, added to the non-aqueous electrolyte, improves the degree of dissociation of the electrolytic salt (lithium salt) in the gelated electrolyte. The result is the significantly improved ionic conductivity in the gelated electrolyte.

Moreover, in the non-aqueous electrolyte cell, employing this non-aqueous electrolyte, lithium ion migration between the positive and negative electrodes occurs smoothly to decrease the internal impedance to realize superior load and low-temperature characteristics. Moreover, if the ionic conductivity of the lithium ions is improved, the cyclic properties of the non-aqueous electrolyte cell are improved simultaneously.

In still another aspect, the present invention provides an electrode for a cell in which an electrode mixture layer containing an active material is formed on a current collector, wherein the electrode mixture layer contains an inorganic compound having a specific inductive capacity not lower than 12.

In yet another aspect, the present invention provides a non-aqueous electrolyte cell including a negative electrode, a positive electrode and a gelated electrolyte, wherein a layer of an electrode mixture containing an active material is formed on a current collector of positive electrode and/or negative electrode, with the electrode mixture layer containing an inorganic compound having a specific inductive capacity not lower than 12.

If the inorganic compound, exhibiting the dielectric performance, is added to the electrode, it improves the degree of dissociation of the electrolytic salt (lithium salt) in the non-aqueous electrolyte present in the layer of the electrode mixture or in the vicinity of the electrode. Moreover, in the non-aqueous electrolyte, present in the layer of the electrode mixture or in the vicinity of the electrode, the ionic conductivity is improved significantly, so that, if the electrode mixture is formed to an increased thickness, an optimum ionic conductivity in the electrode mixture may be achieved. If this electrode is used in the non-aqueous electrolyte cell, optimum load characteristics are achieved.

In the non-aqueous electrolyte cell, employing this electrode, the conductivity of lithium ions in the electrode mixture is optimum to decrease the internal impedance to realize superior load and low-temperature characteristics. Moreover, if the ionic conductivity of the lithium ions is improved, the cyclic properties of the non-aqueous electrolyte cell are improved simultaneously.

It will be seen from above that, since the separator of the present invention contains an inorganic compound having a specific inductive capacity not less than 12, the degree of dissociation of the lithium compound as an electrolytic salt contained in the non-aqueous electrolyte present in and near pores is improved to provide for high ion conductivity.

Since there is no necessity of increasing the porosity or reducing the thickness of the separator, the function as a diaphragm of the separator is sufficiently guaranteed, while the separator may possess sufficient mechanical or thermal strength.

In the non-aqueous electrolyte cell employing the separator, lithium ion migration between the positive and negative electrodes occurs smoothly to lower the internal impedance to realize superior load and low temperature characteristics, while the high capacity and improved cyclic characteristics may be achieved simultaneously.

Moreover, since the gelated electrolyte of the present invention includes the inorganic compound having the specific inductive capacity not less than 12, the degree of dissociation of the lithium compound, as the electrolytic salt, is increased, so that the gelated electrolyte according to the present invention is superior in dielectric constant and ionic conductivity. In addition, the gelated electrolyte according to the present invention is insusceptible to crystallization at low temperature environment.

In the non-aqueous electrolyte cell employing the gelated electrolyte, lithium ion migration between the layers of the positive and negative electrode active materials occurs smoothly to decrease the internal impedance to realize superior load and low temperature characteristics, at the same time as high capacity and superior cyclic characteristics are achieved.

Since the non-aqueous electrolyte according to the present invention contains an inorganic compound having the specific inductive capacity not less than 12, the degree of dissociation of the lithium compound, as the electrolytic salt, is increased, so that the gelated electrolyte according to the present invention is superior in dielectric constant and ionic conductivity. Also, non-aqueous electrolyte according to the present invention is insusceptible to crystallization at a low temperature environment.

Moreover, in the non-aqueous electrolyte cell employing the non-aqueous electrolyte according to the present invention, lithium ion migration between the layers of the positive and negative electrode active materials occurs smoothly to decrease the internal impedance to realize superior load and low temperature characteristics, at the same time as high capacity and superior cyclic characteristics are achieved.

Since the electrode according to the present invention contains an inorganic compound having the specific inductive capacity not less than 12, the lithium compound, as the electrolytic salt, contained in the non-aqueous electrolyte existing in and around the electrode is increased in the degree of dissociation.

In addition, in the non-aqueous electrolyte cell employing the above electrode, the non-aqueous electrolyte existing in the layer of the electrode mixture or in the vicinity of the electrode is improved to realize superior ionic conductivity, so that the ionic conductivity of the entire non-aqueous electrolyte cell is optimum to decrease the internal impedance. In the non-aqueous electrolyte cell according to the present invention, load characteristics are optimum even if the active material(s) of the positive electrode and/or the negative electrode are formed to increased thickness.

Thus, the result is the superior load and low temperature characteristics, a high capacity and appreciably improved cyclic characteristics.

DESCRIPTION OF THE PREFERRED EMBODIMENTS

Figure 1:
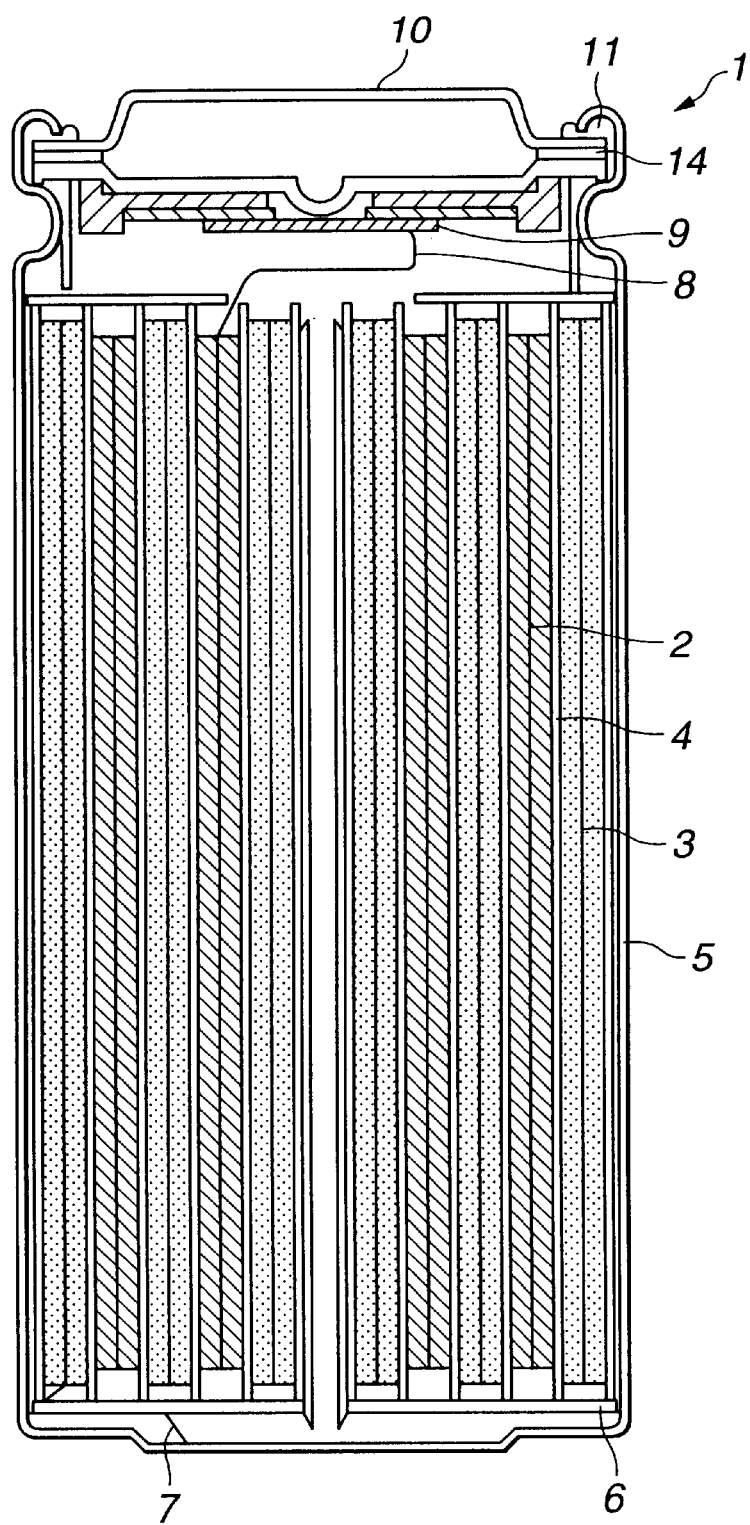
FIG. 1 is a longitudinal cross-sectional view showing an embodiment of a non-aqueous electrolyte cell according to the present invention.

Referring to the drawings, a separator, a gelated electrolyte, a non-aqueous electrolyte, an electrode and a non-aqueous electrolyte cell, according to the present invention, will be explained in detail.

In the following, the structure and the component materials of the separator and the non-aqueous electrolyte cell are explained only by way of illustration. The present invention is not limited to the non-aqueous electrolyte cell, given herein by way of illustration, since the structure or the material of the respective thin films may be suitably selected depending on the objective or the performance desired.

The separator according to the present invention is used in e.g., a non-aqueous electrolyte cell and plays the role as a diaphragm for preventing contact and resulting shorting between the positive and negative electrode active materials, while playing the role as an ion conduction film by being impregnated with an electrolytic solution.

The above separator is formed of a high molecular material, such as polyolefin or polyvinylidene fluoride, containing olefins or vinylidene fluoride, as repetitive units. The separator is normally a porous film having a multiplicity of fine pores.

The separator of the present invention contains an inorganic compound, having a specific inductive capacity of not less than 12.

Among the inorganic compounds, having the specific inductive capacity of not less than 12, there are those exhibiting ferroelectricity and those exhibiting paraelectricity. This does not matter if the specific inductive capacity is not less than 12. A higher value of the specific inductive capacity is desirable. The inorganic compound exhibiting ferroelectricity may be exemplified by $BaTiO_3$ and $TiO_2$. The inorganic compound exhibiting paraelectricity may be exemplified by BaO.

These compounds are chemically stable and hence are insoluble or difficultly soluble in a non-aqueous electrolyte. Moreover, the compounds are not dissociated as ions, while the compounds are electrochemically stable and hence are not reacted with the positive electrode nor with the negative electrode.

By the content of the aforementioned inorganic compounds, the lithium compound, as an electrolyte salt, contained in the pores in the separator or in the non-aqueous electrolyte present around the separator, becomes higher in the degree of dissociation, so that the resistance to lithium ions in the separator is lowered to elevate the ion conductivity.

The above separator may be a single-layer or a multi-layered film. If the separator is a multi-layered film, it is sufficient if the inorganic compound having the specific inductive capacity is dispersed in an optional layer. Of course, if the separator is of a multi-layered structure, the inorganic compound having the specific inductive capacity of not less than 12 may be dispersed in two or more layers or in the totality of the layers.

In the following, the structure or the material making up the gelated electrolyte and the non-aqueous electrolyte cell is explained by taking an illustrative structure or material as examples. However, the present invention is not limited to the non-aqueous electrolyte cells, taken only as examples, such that any suitable structure or material of the respective thin films may be selected depending on the objective or properties desired.

The gelated electrolyte, according to the present invention, plays the role of an ion conductor between the positive electrode active material and the negative electrode active material.

The non-aqueous solvent may be exemplified by ethylene carbonate, propylene carbonate, dimethyl carbonate, ethylmethyl carbonate, diethyl carbonate, γ-butyrolactone, ethylpropyl carbonate, dipropyl carbonate, butyl propyl carbonate, dibuthyl carbonate, 1,2-dimethoxyethane and 1,2-diethoxyethane.

As electrolytic salt, at least one lithium compound, selected from among $LiPF_6$, $LiBF_4$, $LiN(C_2F_5SO_2)_2$, $LiN(CF_3SO_2)_2$ and $LiCF_3SO_3$ may be used.

As a high molecular matrix, such a compound containing at least one of vinylidene fluoride, acrylonitrile, ethylene oxide, propylene oxide and methacrylonitrile, as a repetitive unit, is used. Specified examples of the high molecular matrix include polyvinylidene fluoride, polyacrylonitrile, polyethylene oxide, polypropylene oxide and polymethacrylonitrile.

The gelated electrolyte encompasses an inorganic compound having the specific inductive capacity of not less than 12. Among the inorganic compounds having the specific inductive capacity of not less than 12, there are those exhibiting ferroelectricity and those exhibiting paraelectricity. This does not matter if the specific inductive capacity is not less than 12. A higher specific inductive capacity is desirable. The inorganic compound exhibiting ferroelectricity may be exemplified by $BaTiO_3$ and $TiO_2$. The inorganic compound exhibiting ferroelectricity may be exemplified by BaO.

These compounds are chemically stable and hence are insoluble or sparingly soluble in the gelated electrolyte. These compounds are not dissociated as ions. These compounds are electrochemically stable and hence are not reacted with the positive electrode nor with the negative electrode.

Since the gelated electrolyte contains an inorganic compound, having the specific inductive capacity not lower than 12, as described above, the lithium compound, as an electrolytic salt, is improved. On the other hand, since the gelated electrolyte is added to with the dielectric inorganic compound, it becomes higher in its dielectric constant. Moreover, since the inorganic compound is added to the gelated electrolyte, its solidifying point is lowered. Under such effect, the gelated electrolyte is not susceptible to crystallization at lower temperatures.

As may be apparent from the foregoing description, since the inorganic compound, having the specific inductive capacity not less than 12, is contained in the gelated electrolyte, the lithium compound, as the electrolytic salt, is improved in the degree of dissociation. As a result, the gelated electrolyte is improved in ionic conductivity, with its dielectric constant becoming higher. By such effect, the gelated electrolyte is less susceptible to crystallization at lower temperatures.

In the following, the structure or the material of each thin film making up the non-aqueous electrolyte and the non-aqueous electrolyte cell is explained by taking an illustrative structure or material as examples. However, the present invention is not limited to the non-aqueous electrolyte cells, taken only as examples, such that any suitable structure or material of the respective thin films may be selected depending on the objective or properties desired.

The non-aqueous electrolyte according to the present invention plays the role of an ionic conductor between the positive and negative electrodes.

As the non-aqueous solvent, a variety of non-aqueous solvents used in the aforementioned non-aqueous electrolyte may be used.

As the electrolytic salt, the aforementioned electrolytic salts may be used.

The non-aqueous electrolyte of the present invention contains an inorganic compound having the dielectric constant not less than 12.

The non-aqueous electrolyte is prepared by dissolving the lithium-containing electrolytic salt in the non-aqueous electrolyte and by dispersing the inorganic compound having the specific inductive capacity not less than 12 as described above in a non-aqueous solvent.

Among the inorganic compounds having the specific inductive capacity of not less than 12, there are those exhibiting ferroelectricity and those exhibiting paraelectricity. This does not matter if the specific inductive capacity is not less than 12. A higher specific inductive capacity is desirable. The inorganic compound exhibiting ferroelectricity may be exemplified by $BaTiO_3$ and $TiO_2$. The inorganic compound exhibiting ferroelectricity may be exemplified by BaO.

These compounds are chemically stable and hence are insoluble or sparingly soluble in the gelated electrolyte. These compounds are not dissociated as ions. These compounds are electrochemically stable and hence are not reacted with the positive electrode nor with the negative electrode.

Since the non-aqueous electrolyte contains an inorganic compound, having the specific inductive capacity not lower than 12, as described above, the lithium compound, as an electrolytic salt, becomes higher in its degree of dissociation On the other hand, since the gelated electrolyte is added to with the dielectric inorganic compound, it is elevated in its dielectric constant. Moreover, since the inorganic compound is added to the gelated electrolyte, its solidifying point is lowered. Under such effect, the non-aqueous electrolyte is not susceptible to crystallization at lower temperatures.

As may be apparent from the foregoing description, since the inorganic compound, having the specific inductive capacity not less than 12, is contained in the non-aqueous electrolyte, the lithium compound, as the electrolytic salt, is improved in the degree of dissociation. As a result, the gelated electrolyte is improved in ionic conductivity, with its dielectric constant becoming higher. Moreover, the gelated electrolyte is less susceptible to crystallization at lower temperatures.

In the following, the structure or the material of each thin film making up the non-aqueous electrolyte and the non-aqueous electrolyte cell is explained by taking an illustrative structure or material as examples. However, the present invention is not limited to the non-aqueous electrolyte cells, taken only as examples, so that any suitable structure or material of the respective thin films may be selected depending on the objective or properties desired.

The electrode for the cell is an electrode mixture layer, containing an active material, formed on a current collector formed e.g., of metal. This layer of the electrode mixture contains a positive electrode active material, as later explained, if the electrode is a positive electrode, while containing a negative electrode active material, as later explained, if the electrode is a negative electrode. The electrode may also be added to with a binder and an electrification agent, as necessary.

In addition to the above-mentioned ingredients, an inorganic compound, having a specific inductive capacity not less than 12 is contained in the electrode for the cell according to the present invention.

Among the inorganic compounds having the specific inductive capacity of not less than 12, there are those exhibiting ferroelectricity and those exhibiting paraelectricity. This does not matter if the specific inductive capacity is not less than 12. A higher specific inductive capacity is desirable. The inorganic compound exhibiting ferroelectricity may be exemplified by $BaTiO_3$ and $TiO_2$. The inorganic compound exhibiting ferroelectricity may be exemplified by BaO.

These compounds are chemically stable and hence are insoluble or sparingly soluble in the non-aqueous electrolyte. These compounds are not dissociated as ions. These compounds are electrochemically stable and hence are not reacted with the electrode.

As may be apparent from the foregoing description, in the electrode for the cell, embodying the present invention, the electrolytic salt in the non-aqueous electrolyte present in the layer of the electrode mixture and in the vicinity of the electrode is improved in the degree of dissociation, thus improving the ionic conductivity. So, if the electrode is used for the non-aqueous electrolyte cell, excellent load characteristics of the cell may be achieved.

The non-aqueous electrolyte cell prepared using a separator embodying the present invention is now explained.

Referring to FIG. 1, a non-aqueous electrolyte cell 1 is a cell element comprised of a strip-like positive electrode 2 and a strip-like negative electrode 3, tightly coiled with the interposition of a separator 4. The cell element, so-formed, is housed within a cell can 5.

The positive electrode 2 is prepared by coating a positive electrode mixture, containing a positive electrode active material and a binder, on a current collector, and by drying the resulting product. The current collector is comprised of a metal foil, such as, for example, an aluminum foil.

The positive electrode active material may be a metal oxide, a metal sulfide or any specified high polymer material, depending on the type of the cell to be prepared.

For example, if the cell is a lithium cell exploiting the dissolution and precipitation of lithium, lithium-free metal sulfides or oxides, such as $TiS_2$, $MoS_2$, $NbSe_2$ or $V_2O_5$, or a high polymer material, such as polyacetylene or polypyrrole, may be used.

If the cell to be prepared is a lithium ion cell exploiting doping/undoping of lithium ions, lithium compound oxides, mainly composed of $Li_xMO_2$, where M is one or more transition metal and x, differing with the charging/discharging state of the cell, is usually not less than 0.05 and not larger than 1.10, may be used. The transition metals M, making up this lithium compound oxide, may preferably be Co, Ni or Mn. Specified examples of the lithium compound oxides include $LiCoO_2$, $LiNiO_2$, $LiNi_yCo_{1-y}$, where $0<y<1$, $LiNMn_2O_4$, and $LiMPO_4$, where M is one or more transition metals, such as Fe.

The lithium compound oxide liable to generate a high voltage and proves an optimum positive electrode active material insofar as the energy density is concerned. If the above-described positive electrode active material is used in forming the positive electrode active material, any suitable known electrification agent or the binder may be used as an additive.

The negative electrode 3 is prepared by coating the negative electrode mixture containing the negative electrode active material and the binder on a current collector and drying the resulting product. As the current collector, a metal foil, such as a copper foil, is used.

For preparing a lithium cell exploiting e.g., dissolution and precipitation of lithium, metal lithium or lithium alloys capable of occluding and emitting lithium, for example, may be used as the negative electrode active material.

For preparing a lithium ion cell, exploiting doping/undoping lithium ions, it is possible to use a carbonaceous material difficult to graphize or a graphite-based carbon material. More specifically, graphite, carbon fibers, such as mesocarbon microbeads, meso-phase carbon fibers, pyrocarbon, cokes, such as pitch coke, needle coke or petroleum coke, vitreous carbon, sintered organic high molecular compounds, such as phenolic or furan resins, carbonized by firing at a suitable temperature, or carbon materials, such as activated charcoal, may be used. In preparing a negative electrode from these materials, any suitable known binders, for example, may be used.

The non-aqueous electrolyte is prepared by dissolving an electrolytic salt in a non-aqueous solvent.

As the non-aqueous solvent, a wide variety of non-aqueous solvents, used up to now in non-aqueous electrolytic solutions, such as, for example, propylene carbonate, ethylene carbonate, dimethoxyethane, dimethyl carbonate, diethyl carbonate, γ-butyrolactone, tetrahydrofuran, 2-methyl tetrahydrofuran, 1, 3-dioxolane, 4-methyl-1, 3-dioxolan, diethylether, sulforane, methyl sulforane, methyl lactate sulforane, acetonitrile, propionitrile or methyl propionate, may be used. These non-aqueous solvents may be used alone or as a mixture.

As the electrolytic salts, at least one compound from among $LiPF_6$, $LiBF_4$, $LiCF_3SO_3$, $LiN(CF_3SO_2)_2$, $LiN(C_2F_5SO_2)_2$, may be used.

The positive electrode and the negative electrode are tightly affixed to each other, with the separator 4 in-between, and coiled a number of times in a helix to complete a cell element.

On the bottom of an iron cell can 5, the inner surface of which is lined with nickel, an insulating plate 6 is inserted, and the cell element is placed thereon.

For assuring the current collection by the negative electrode 3, one end of a negative electrode lead 7, formed of nickel, is press-fitted to the negative electrode 3, with the other end of the negative electrode lead 7 being welded to the cell can 5. This connects the cell can 5 electrically to the negative electrode 3 so that the can may be used as an external negative electrode terminal of the non-aqueous electrolyte cell 1.

For assuring the current collection by the positive electrode 2, one end of a positive electrode lead 8, formed e.g., of aluminium, with the other end of the lead 8 being electrically connected to a cell lid 10 with the interposition of a thin sheet 9 for current interruption. This sheet 9 interrupts the current depending on the internal pressure in the cell. This connects the cell lid 10 electrically to the positive electrode 2 so that the lid may be used as an external positive electrode terminal of the non-aqueous electrolyte cell 1.

The non-aqueous electrolytic solution is then injected into the cell can 5. This non-aqueous electrolytic solution is prepared by dissolving the electrolytic salt in the non-aqueous solvent, as explained previously.

Finally, the cell can 5 is caulked via an insulating sealing gasket, coated with asphalt, to affix the cell lid 10 in position to complete the cylindrically-shaped non-aqueous electrolyte cell 1.

Since the above-described non-aqueous electrolyte cell 1 uses the separator 4 containing an inorganic compound having the specific inductive capacity not less than 12, as a separator, lithium ions can be migrated smoothly between the positive electrode 2 and the negative electrode 3 thus lowering the internal impedance of the cell.

The result is high load characteristics, superior low temperature characteristics, a high cell capacity and improved cyclic characteristics.

Although the shape of the non-aqueous electrolyte cell 1 here is cylindrical, the cell 1 may be of any other suitable shape, such as a square, coin or button shape, there being no limitation as to the shape or the size of the cell 1.

Although the foregoing description has been made with reference to an embodiment employing a solution type non-aqueous electrolyte and an electrode can, a thin type cell having a laminated film as an exterior material without using an cell can be used if a gelated electrolyte or a solid electrolyte is used as the aforementioned non-aqueous electrolyte.

The gelated electrolyte or the solid electrolyte is basically composed of an electrolytic salt, a non-aqueous solvent for dissolving the electrolytic salt therein, and a high molecular matrix for holding the non-aqueous solvent.

As the non-aqueous solvent or the electrolytic salt, non-aqueous solvents or electrolytic salts similar to those in the case of the solution type non-aqueous electrolyte are used.

The high molecular matrix may be selected from among polyvinylidene fluoride, polyacrylonitrile, polyethylene oxide, polypropylene oxide and polymethacrylonitrile, depending on the using state, such as gelated or solid state.

Figure 2:
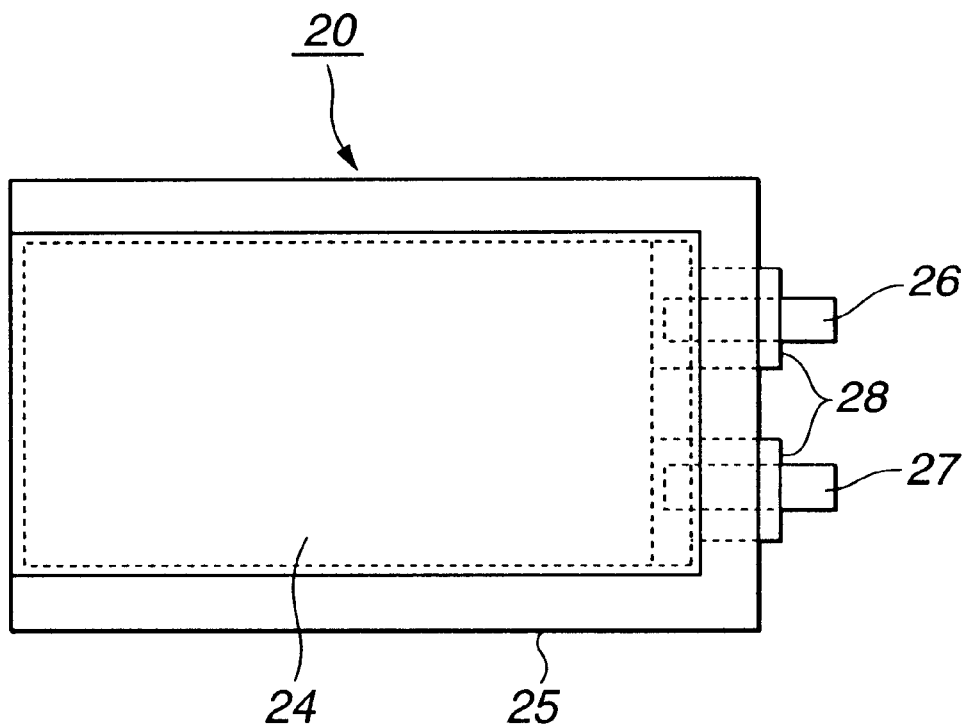
FIG. 2 is a plan view showing a modification of the non-aqueous electrolyte cell according to the present invention.
Figure 3:
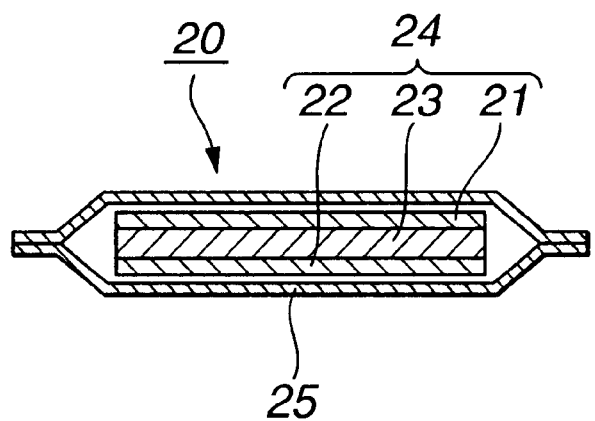
FIG. 3 is a cross-sectional view showing the non-aqueous electrolyte cell.

FIGS. 2 and 3 show an illustrative structure of a thin-type non-aqueous electrolyte cell 20. This non-aqueous electrolyte cell 20 is comprised of a cell element 24 enclosed within the interior of an exterior film 25. The cell element 24 is made up of a positive electrode 21 having a layer of a positive electrode active material and a negative electrode 22 having a layer of a negative electrode active material, with the positive electrode 21 and the negative electrode 22 being stacked together with the separator 23 in-between.

The current collector of the positive electrode 21 is connected to a positive electrode lead 26, whilst the current collector of the negative electrode 22 is connected to a negative electrode lead 27. In a sealing portion of the positive electrode lead 26 to the exterior film 25 and in a sealing portion of the negative electrode lead 27 to the exterior film 25, there are interposed resin films 28, 28 for assuring insulating properties. One ends of the resin films 28, 28 are extended outwards.

On the layers of the active materials of the positive electrode 21 and the negative electrode 22 are impregnated layers of the gelated electrolyte, which are then solidified. The positive electrode 21 and the negative electrode 22 are stacked together, via separator 23, so that the respective layers of the gelated electrolytes face each other.

So, the separator 23 is partially impregnated with a non-aqueous solvent in which is dissolved the gelated electrolyte or with the electrolyte salt contained therein.

If a separator containing an inorganic compound having the specific inductive capacity not less than 12 is used as the separator 23, the internal impedance is lowered, whilst load characteristics, low-temperature characteristics, capacity and cyclic characteristics are improved appreciably, as in the above-described non-aqueous electrolyte cell 1.

The non-aqueous electrolyte cell prepared using the gelated electrolyte, embodying the present invention, is hereinafter explained.

Figure 4:
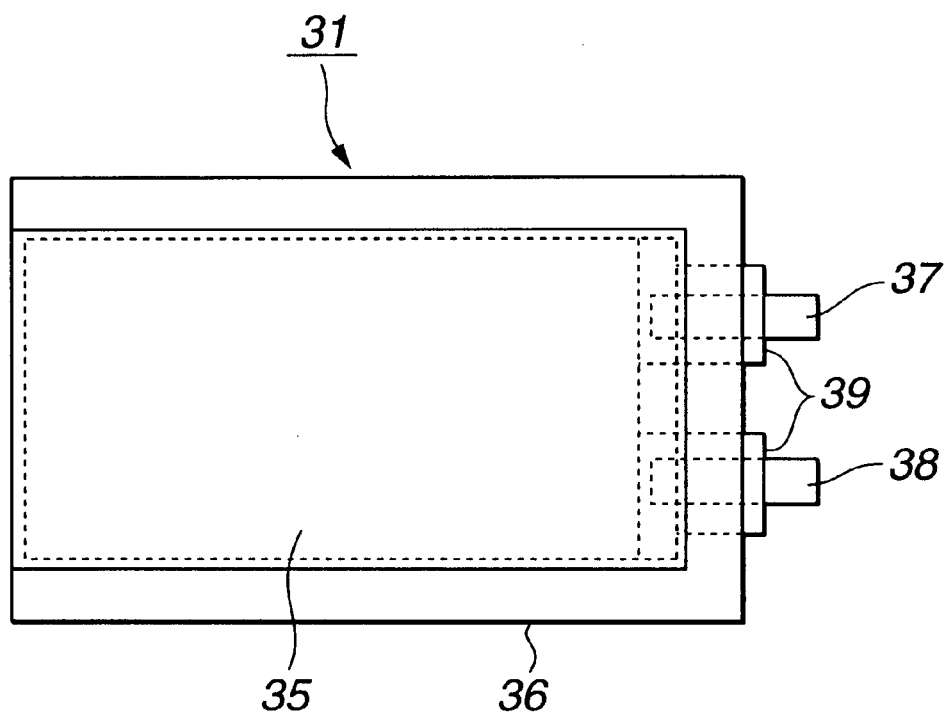
FIG. 4 is a plan view of the non-aqueous electrolyte cell embodying the present invention.
Figure 5:
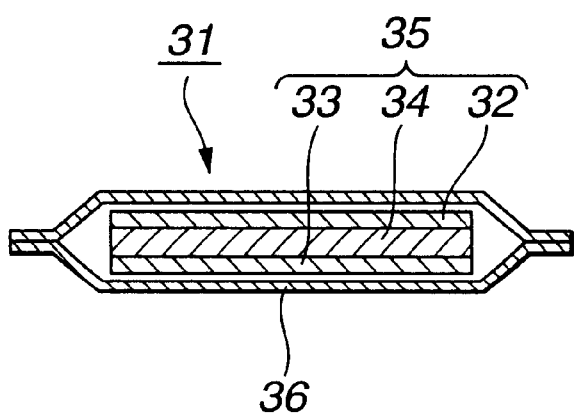
FIG. 5 is a cross-sectional view of the non-aqueous electrolyte cell embodying the present invention.

Referring to FIGS. 4 and 5, a gelated electrolyte cell 31 is comprised of a cell element 35, accommodated within an exterior film 36. The cell element 35 is made up of a layer of a positive electrode active material 32 and a layer of a negative electrode active material 33 on both sides of a gelated electrolyte 34. The layer of the positive electrode active material 32 and the layer of the negative electrode active material 33 are connected to a positive electrode lead 37 and to a negative electrode lead 38, respectively. The positive electrode lead 37 and the negative electrode lead 38 are bonded via a resin film 39 to an exterior film 36.

In FIG. 4, the gelated electrolyte 31, the layer of the positive electrode active material 33 and the layer of the negative electrode active material 34 are omitted from the drawing. In FIG. 5, the positive electrode lead 37, negative electrode lead 38 and the resin film 39 are similarly omitted from the drawing.

As the positive electrode active material 32, such material as is used in the above-described lithium cell or lithium ion cell may be used.

The positive electrode active material is coated on one surface of the positive electrode current collector of e.g., aluminum, and dried, after which it is compression-molded by a roll press to prove the layer of the positive electrode active material 32.

As the negative electrode active material, metal lithium or a lithium alloy capable of occluding and emitting lithium may be used if the aforementioned lithium call exploiting lithium dissolution and precipitation is to be prepared.

The layer of the negative electrode active material is coated on one surface of the negative electrode current collector of e.g., copper and dried, after which it is compression-molded by a roll press to prove the layer of the negative electrode active material 33.

In forming the cell element 35, the gelated electrolyte 34 is coated on one surface of each of the layer of the positive electrode active material 32 and the layer of the negative electrode active material 33 and the surfaces of the layers 32, 33 carrying the gelated electrolyte 34 are stuck to each other.

In the above-described embodiment, no separator is used, however, a separator may be interposed when the layers 32, 33 are stuck together with the surfaces thereof carrying the gelated electrolyte 34 facing each other. As this separator, any suitable known polyolefinic separator may be used.

The cell element 35 is accommodated in the exterior film 36, which may, for example, be formed by a heat sealing type sheet-shaped laminated film comprised of an exterior protective layer, an aluminum layer and a heat fusing layer (innermost laminate layer).

The materials of the heat fusing layer and the external protective layer may, for example, be a plastic film. The plastic film 36 forming the heat fusing layer may be formed e.g., of polyethylene, polypropylene or nylon (trade name), without regard to the material type if the material is a thermoplastic material.

The positive electrode lead 37 and the negative electrode lead 38 are affixed to the layer of the positive electrode active material 32 and to the layer of the negative electrode active material 33, respectively, and are electrically connected to an external electronic equipment. Examples of the materials used for the positive electrode lead 37 include aluminum, titanium and alloys thereof. Examples of the materials used for the negative electrode lead 38 include copper, nickel and alloys thereof.

The resin film 39 is arranged in a contact portion between the exterior film 36, positive electrode lead 37 and the negative electrode lead 38. The provision of the resin film 39 is effective to prevent shorting due to burring of the exterior film 36 as well as to improve contact between the exterior film 36, positive electrode lead 37 and the negative electrode lead 38.

There is no particular limitation to the type of the material of the resin film 39 if the material exhibits adhesion to the positive electrode lead 37 and to the negative electrode lead 38. It is however preferred to use polyolefinic resin, such as polyethylene, polypropylene, modified polyethylene, modified polypropylene or copolymers thereof.

The above-described non-aqueous electrolyte cell 1 uses the gelated electrolyte 4 containing an inorganic compound having the specific inductive capacity of 12 or higher, as the non-aqueous electrolyte, lithium ion migration between the layer of the positive electrode and the layer of the negative electrode 33 occurs smoothly, thus lowering the internal impedance.

Therefore, not only superior load characteristics, low temperature characteristics and a high capacity are achieved, but also the cyclic characteristics are improved appreciably.

The non-aqueous electrolyte cell prepared using the non-aqueous electrolyte embodying the present invention is hereinafter explained.

The non-aqueous electrolyte cell 1 is comprised of the strip-shaped positive and negative electrodes 2 and 3 tightly affixed to each other, with the separator 4 in-between, and coiled a number of times in a helix to complete a coiled set as shown in FIG. 1.

As the positive electrode active material, the metal oxide, metal sulfide or specified high molecular materials as aforementioned, may be used depending on the cell type.

If the lithium cell exploiting lithium dissolution and precipitation, as discussed above, is to be prepared, metal lithium or lithium alloys capable of occluding and emitting lithium may be used as the negative electrode active material.

The positive electrode 2 and the negative electrode 3, obtained as discussed above, are tightly contacted with one another, via separator 4, and coiled in a helix a number of turns to complete a cell element.

An insulating plate 6 is placed on the bottom of the cell can 5 of iron, the inner surface of which is lined with a nickel plating, and the cell element is housed therein.

For assuring current collection of the negative electrode 3, one end of the negative electrode lead 7 of, for example, nickel, is press-fitted to the negative electrode 3, with the other end being welded to the cell can 5. This electrically connects the cell can 5 to the negative electrode 3 so that the cell can 5 proves an external negative terminal of the non-aqueous electrolyte cell 1.

Also, for assuring current collection of the positive electrode 2, one end of the positive electrode lead 8 of, for example, aluminum, is mounted on the positive electrode 2, with the other end thereof being electrically connected to the cell lid 10 via a thin plate for current interruption 9. This thin plate for current interruption 9 interrupts the current depending on the internal pressure in the cell. This electrically connects the cell lid 10 to the positive electrode 2 to serve as the external positive electrode of the non-aqueous electrolyte cell 1.

Into this cell can 5 is poured a non-aqueous electrolytic solution, which has been prepared on dissolving an electrolytic salt in a non-aqueous solvent, as described above.

Finally, the cell can 5 is caulked via an insulating sealing gasket 11, coated with asphalt, to fabricate a cylindrically-shaped non-aqueous electrolyte cell.

In the non-aqueous electrolyte cell, described above, in which the inorganic compound with a specific inductive capacity not less than 12 is contained in the non-aqueous electrolyte, lithium ion migration across the positive electrode 2 and the negative electrode 3 occurs smoothly to lower the internal impedance.

The result is high load characteristics, superior low temperature characteristics, a high cell capacity and improved cyclic characteristics.

The non-aqueous electrolyte cell, prepared using an electrode embodying the present invention, is now explained. The non-aqueous electrolyte cell 1 and the gelated electrolyte cell 20 are substantially similar in structure to those shown in FIGS. 2 and 3, respectively. The difference of the cells 1 and 20 from the cells shown in FIGS. 2 and 3 resides in the electrode structure and more specifically in whether or not the inorganic compound with the specific inductive capacity not less than 12 is contained in the layer of the electrode mixture.

So, the non-aqueous electrolyte cell and the gelated electrolyte cell are otherwise the same in respective constituent conditions as those described above.

In the non-aqueous electrolyte cell or the gelated electrolyte cell, constructed as discussed above, an inorganic compound with the specific inductive capacity not less than 12 is contained in the positive electrode and/or the negative electrode. If this inorganic compound with the specific inductive capacity not less than 12 is contained in the positive electrode, it is added to the positive electrode mixture, whereas, if the compound is contained in the negative electrode, it is added to the negative electrode mixture. The result is that the degree of dissociation of the non-aqueous electrolyte present in the layer of the electrode mixture or in the vicinity of the electrode is improved to improve the ion conductivity.

As may be seen from the foregoing explanation, since the inorganic compound having the specific inductive capacity not less than 12 is contained in one or both of the positive and negative electrodes, the non-aqueous electrolyte cell or the gelated electrolyte cell is improved in the degree of dissociation of the non-aqueous electrolyte present in the layer of the electrode mixture or in the vicinity of the electrode, and hence in the ion conductivity. The result is the improved ion conductivity of the non-aqueous electrolyte cell or the gelated electrolyte cell, thus lowering the internal impedance. Moreover, the non-aqueous electrolyte cell exhibits optimum load characteristics even if the active material of the positive electrode and/or the negative electrode is formed to a thicker thickness.

The result is high load characteristics, superior low temperature characteristics, a high cell capacity and improved cyclic characteristics.

EXAMPLES

The present invention is now explained with reference to several Examples based on experimental results.
Non-Aqueous Electrolyte Cell Containing an Inorganic Compound in a Separator Thereof

EXAMPLE 1

First, a layer of a negative electrode active material is prepared. First, 90 parts by weight of pulverized graphite powders and 10 parts by weight of polyvinylidene fluoride, as a binder, were mixed together to form a negative electrode mixture. This negative electrode mixture then was dispersed in N-methyl pyrrolidone to form a slurry. This slurry was then coated uniformly on one surface of a strip-shaped copper foil, 10 $\mu$m in thickness, which later proves a negative electrode current collector. The resulting product then was dried and compression-molded in a roll press to form a layer of a negative electrode active material.

A layer of the positive electrode active material then was prepared. First, $LiCO_3$ and $CoCO_3$ were mixed together, at a molar ratio of 0.5 to 1.0, and sintered in air at 900° C. for five hours to form $LiCoO_2$. 91 parts by weight of this $LiCoO_2$, 6 parts by weight of graphite, as an electrification agent, and 3 parts by weight of polyvinylidene fluoride, as a binder, were mixed together to form a positive electrode mixture. This positive electrode mixture then was dispersed in N-methyl pyrrolidone to form a slurry. This slurry then was coated uniformly on one surface of a strip-shaped aluminum foil, 20 $\mu$m in thickness, which later proves a positive electrode current collector. The resulting product then was dried and compression-molded in a roll press to form a layer of a positive electrode active material.

A non-aqueous electrolyte then was prepared. Fifteen parts by weight of ethylene carbonate (EC), 15 parts by weight of propylene carbonate (PC), 50 parts by weight of diethyl carbonate and 20 parts by weight of $LiPF_6$, as an electrolytic salt, were mixed together to form a non-aqueous electrolyte.

The separator then was prepared. First, 40 parts by weight of polypropylene, with a weight average molecular weight of 1000000, and 40 parts by weight of high-density polyethylene, with a weight average molecular weight of 800000, were mixed together. To this mixture were added 10 parts by weight of $BaTiO_3$. 10 parts by weight of polypropylene, with a weight average molecular weight of 1000000, were separately provided. On each major surface of a polypropylene layer, 12 $\mu$m in thickness, a mixed polyethylene-polypropylene layer, each 12 $\mu$m in thickness, was formed to form a laminated film. The temperature of a die in a T-die extruder was set to 230° C., with the temperature of a cooling roll being set to 80° C. The laminated film was heat-treated in air under heat treatment condition of the heat-treatment temperature of 125° C. and heat-treatment time of 40 hours. The laminated film was then stretched, using a roll stretching device. It is noted that the laminated film was initially stretched at a lower temperature at 25° C. until the stretching ratio in the longitudinal direction of the laminated film was 40% and subsequently stretched at 120° C. until the stretching ratio reached 20%. The length in the longitudinal direction of the laminated film, stretched as described above, then was contracted by 10% at 11.5° C. The separator, as a white porous film, based on polyolefin, was prepared.

The layers of the positive electrode active material and the negative electrode active material were press-bonded to each other, with the separator in-between, to form a coiled product, which then was accommodated in a cell can. A non-aqueous electrolyte was then poured into the can to fabricate a non-aqueous electrolyte cell.

EXAMPLE 2

In preparing the separator, 31.1 parts by weight of polypropylene, with a weight average molecular weight of 1000000, and 31.1 parts by weight of high-density polyethylene, with a weight average molecular weight of800000, were mixed together. To this mixture were added 30 parts by weight of $BaTiO_3$. Also, 7.8 parts by weight of polypropylene, with a weight average molecular weight of 1000000, were prepared separately. A non-aqueous electrolyte cell was prepared by otherwise the same method as that of Example 1.

EXAMPLE 3

First, a layer of a positive electrode active material, a negative electrode active material and a non-aqueous electrolyte, were prepared in the same way as in Example 1.

A separator then was prepared. First, 10 parts by weight of polyvinylidene fluoride were dissolved in a liquid mixture of 20 parts by weight of ethanol, 20 parts by weight of isopropanol, 10 parts by weight of 1-butanol and 35 parts by weight of tetrahydrofuran. Meanwhile, ethanol, isopropanol, 1-butanol and tetrahydrofuran were used as volatile layer separating agent. To the resulting mixture were added 5 parts by weight of $BaTiO_3$ to form a coating solution. This coating solution was coated on a PTT film previously processed for mold releasing. The resulting product was dried at 50° C. The film formed by the coating solution was peeled from the PET film to form a polyvinylidene fluoride based separator.

Finally, the layers of the positive and negative electrode active materials were press-fitted to each other, with the separator in-between, to form a coiled set. This coiled set was accommodated in a cell can into which was then poured a non-aqueous electrolyte to complete a non-aqueous electrolyte cell.

EXAMPLE 4

A non-aqueous electrolyte cell was prepared in the same way as in Example 1 except adding $TiO_2$ instead of $BaTiO_3$ in the separator.

EXAMPLE 5

A non-aqueous electrolyte cell was prepared in the same way as in Example 1 except adding BaO instead of $BaTiO_3$ in the separator.

EXAMPLE 6

First, the layers of the positive and negative electrode active materials and the separator were prepared in the same way as in Example 1.

Next, a gelated electrolyte was prepared. First, 12 parts by weight of ethylene carbonate (EC), 6 parts by weight of propylene carbonate (PC) and 6 parts by weight of $LiPF_6$, as an electrolytic salt, were mixed together to form a plasticizer. To this plasticizer were mixed 10 parts by weight of a block copolymer (vinylidene fluoride-co-hexafluoropropylene), having a molecular weight of 600000, and 60 parts by weight of diethyl carbonate, were mixed together and dissolved. The resulting solution was uniformly coated on one surface of each of the layers of the negative and positive electrode active materials for impregnation. The resulting product was allowed to stand at room temperature for eight hours to vaporize diethyl carbonate off to form a gelated electrolyte.

Finally, the layers of the positive and negative electrode active materials, coated with the gelated electrolyte, were press-fitted to each other, with the surfaces carrying the gelated electrolyte facing each other, to fabricate a non-aqueous electrolyte cell 2.5 cm×4.0 cm×0.3 mm in size.

Comparative Example 1

In preparing a separator, 44.4 parts by weight of polypropylene, with a weight average molecular weight of 1000000, and 44.4 parts by weight of high-density polyethylene, with a weight average molecular weight of 800000, were mixed together. Here, $BaTiO_3$ was not added. Also, 11.2 parts by weight of polypropylene, with a weight average molecular weight of 1000000, were prepared separately. A non-aqueous electrolyte cell was prepared by otherwise the same method as that of Example 1.

Comparative Example 2

In preparing a separator, the amount of polyvinylidene fluoride was set to 15 parts by weight, while $BaTiO_3$ was not added. A non-aqueous electrolyte cell was prepared by otherwise the same method as that of Example 3.

Comparative Example 3

In preparing a separator, $Al_2O_3$ was added in place of adding $BaTiO_3$. A non-aqueous electrolyte cell was prepared in otherwise the same method as in Example 1.

Comparative Example 4

In preparing a separator, 45 parts by weight of polypropylene, with a weight average molecular weight of 1000000, and 45 parts by weight of high-density polyethylene, with a weight average molecular weight of 800000, were mixed together. Here, $BaTiO_3$ was not added. Also, 10 parts by weight of polypropylene, with a weight average molecular weight of 1000000, were prepared separately. A non-aqueous electrolyte cell was prepared by otherwise the same method as that of Example 1.

Of the materials, prepared in the Examples 1 to 6 and Comparative Examples 1 to 4, cyclic service life, load characteristics and low-temperature characteristics were measured by the following method:

500 charging/discharging cyclic tests were carried out at a two-hour rate charging (1/2C) of the theoretical capacity to make the following evaluation: First, constant current constant charging was carried out for each cell at 23° C. up to an upper limit of 4.2V for ten hours. Two-hour rate discharging (1/2C) then was carried out up to a terminal voltage of 3.2 V. After setting the discharging capacity in this manner and, from the average voltage, as found from this discharge capacity, an output at the hour rate discharging was calculated as a percentage value with respect to the 5-hour rate discharging (1/5C) of an earlier time of the cycle period.

Load Characteristics

1/3 hour rate discharging (3C) of the theoretcal capacity was carried out to make the following evaluation: First, constant current constant voltage charging was carried out for each cell at 23° C. for ten hours up to an upper limit of 4.2 V. The 1/3 hour rate discharging (3C) was then carried out up to a terminal voltage of 3.2 V. The discharging capacity was set in this manner. From the average voltage, as found from this discharging capacity, an output at each hour rate as a percentage to the 5-hour rate discharging (1/5C).

Low-Temperature Characteristics

Two-hour rate discharging (3C) of the theoretical capacity was carried out to make evaluation in the following manner: First, constant current constant voltage charging was carried out for each cell at 23° C. for ten hours up to an upper limit of 4.2 V. The two hour rate discharging (1/2C) was then carried out at −20° C. up to a terminal voltage of 3.2 V. The discharging capacity was set in this manner. From the average voltage, as found from this discharging capacity, an output at each hour rate was calculated as a percentage to the 5-hour rate discharging (1/5C) at ambient temperature (23° C.).

Table 1 below shows the results as measured of cyclic service life, load characteristics and low temperature characteristics of the Examples 1 to 6 and Comparative Examples 1 to 4:

|  | cyclic characteristics (%) | load characteristics (%) | low temperature characteristics (%) |
| --- | --- | --- | --- |
| Ex. 1 | 88 | 72 | 81 |
| Ex. 2 | 85 | 67 | 76 |
| Ex. 3 | 86 | 76 | 77 |
| Ex. 4 | 85 | 68 | 58 |
| Ex. 5 | 85 | 63 | 71 |
| Ex. 6 | 89 | 82 | 83 |
| Comp. Ex. 1 | 85 | 60 | 70 |
| Comp. Ex. 2 | 85 | 55 | 46 |
| Comp. Ex. 3 | 74 | 56 | 68 |
| Comp. Ex. 4 | 89 | 71 | 58 |

It is seen from Table 1 that Examples 1 and 2, containing 10 to 30 parts by weight of $BaTiO_3$ in the polyolefin-based separator, have been improved as to cyclic service life, load characteristics and in low-temperature characteristics as compared to the Comparative Example 1 not containing $BaTiO_3$.

It is also seen that the Example 3, containing 5 parts by weight of $BaTiO_3$ in the polyolefin-based separator has been improved as to cyclic service life, load characteristics and low-temperature characteristics as compared to the Comparative Example 2 not containing $BaTiO_3$.

It is also seen that the Example 4, containing 10 parts by weight of $TiO_2$ in the polyolefin-based separator has been improved as to cyclic service life, load characteristics and in low-temperature characteristics as compared to the Comparative Example 1 not containing $TiO_2$.

It is also seen that the Example 5, containing 10 parts by weight of BaO in the polyolefin-based separator has been improved as to cyclic service life, load characteristics and in low-temperature characteristics as compared to the Comparative Example 1 not containing BaO.

It is also seen that the Example 5, containing 10 parts by weight of $BaTiO_3$ in the polyolefin-based separator and employing a gelated electrolyte as a non-aqueous electrolyte, has been improved as to cyclic service life, load characteristics and low-temperature characteristics as compared to the Comparative Example 4 not containing $BaTiO_3$.

Moreover, it is seen that the Comparative Example 6 containing 10 parts by weight of $BaTiO_3$ in the polyolefin-based separator and employing the gelated electrolyte as a non-aqueous electrolyte has been improved as to cyclic service life, load characteristics and in low-temperature characteristics as compared to Example 1 containing 10 parts by weight of $BaTiO_3$.

Non-Aqueous Electrolyte Cell Containing an Inorganic Compound in a Gelated Electrolyte

EXAMPLE 7

First, a layer of a negative electrode active material was prepared. First, 90 parts by weight of graphite powders and 10 parts by weight of polyvinylidene fluoride, as a binder, were mixed together to prepare a negative electrode mixture. This negative electrode mixture then was dispersed in N-methyl-2-pyrrolidone to form a slurry. This slurry was then coated uniformly on one surface of a strip-shaped copper foil, 10 µm in thickness, which later proves a negative electrode current collector, and dried in situ. The resulting product was compression-molded in N-methyl-2-pyrrolidone to form a layer of the negative electrode active material.

A layer of the positive electrode active material then was prepared. First, $LiCO_3$ and $CoCO_3$ were mixed at a molar ratio of 0.5 to 1.0 and the resulting mixture was sintered in air at 900° C. for five hours to prepare $LiCoO_2$. 91 parts by weight of $LiCoO_2$, 6 parts by weight of graphite, as an electrification agent, and 3 parts by weight of polyvinylidene fluoride, as a binder, were mixed together to give a positive electrode mixture, which then was dispersed in N-methyl-2-pyrrolidone to give a slurry. This slurry was uniformly coated on one surface of a strip-shaped aluminum foil, 20 μm in thickness, serving as a positive electrode current collector, and dried in situ. The resulting product was compression-molded in a roll press to give a layer of the positive electrode active material.

A gelated electrolyte then was prepared. 11.5 parts by weight of ethylene carbonate (EC), 11.5 parts by weight of propylene carbonate (PC) and 4 parts by weight of $LiPF_6$, as an electrolytic salt, were mixed together to prepare a plasticizer, to which 3 parts by weight of $BaTiO_3$ were added and dispersed uniformly. The resulting product was dissolved in a mixture of 10 parts by weight of a poly(vinylidene fluoride-co-hexafluoropropylene) copolymer, with a molecular weight of 600000, and 60 parts by weight of diethyl carbonate. The resulting solution was uniformly coated on one surface of each of the layers of the negative and positive electrode active materials for impregnation. The resulting product was allowed to stand at ambient temperature for eight hours to vaporize diethyl carbonate off to prepare a gelated electrolyte.

Finally, the layers of the positive electrode active material and the negative electrode active material, each coated with the gelated electrolyte, were pressed together, with the surfaces thereof carrying the gelated electrolyte facing each other. In this manner, a plate-shaped gelated electrolyte cell, 2.5 cm×4.0 cm×0.3 mm in size, was prepared.

EXAMPLE 8

First, the layers of the positive electrode active material and the negative electrode active material were prepared by a method similar to the method of Example 7.

A gelated electrolyte then was prepared. 9.3 parts by weight of ethylene carbonate (EC), 9.3 parts by weight of propylene carbonate (PC) and 3.3 parts by weight of $LiPF_6$ were mixed together to prepare a plasticizer, to which 10.9 parts by weight of $BaTiO_3$ were added and dispersed evenly. To the resulting product were mixed and dissolved 7.2 parts by weight of a poly(vinylidene fluoride-co-hexafluoropropylene) copolymer, with a molecular weight of 600000, and 60 parts by weight of diethyl carbonate. The resulting solution was uniformly coated on one surface of each of the layers of the negative and positive electrode active materials for impregnation. The resulting product was allowed to stand at ambient temperature for eight hours to vaporize diethyl carbonate off to prepare a gelated electrolyte.

Finally, the layers of the positive and negative electrode active materials, coated with the gelated electrolyte, were press-fitted together, with the surfaces carrying the gelated electrolyte facing each other, to fabricate a flat-plate-shaped gelated electrolyte cell, 2.5 cm×4.0 cm×0.3 mm in size.

EXAMPLE 9

First, the layers of the positive and negative electrode active materials were prepared by a method similar to one used in Example 7.

Next, a gelated electrolyte was fabricated. First, 8.4 parts by weight of ethylene carbonate (EC), 8.4 parts by weight of propylene carbonate (PC) and 3 parts by weight of $LiPF_6$ were mixed together to give a plasticizer, to which 13.7 parts by weight of $BaTiO_3$ were added and dispersed uniformly. To the resulting product were mixed and dissolved 13.7 parts by weight of a poly(vinylidene fluoride-co-hexafluoropropylene) copolymer, with a molecular weight of 600000, and 60 parts by weight of diethyl carbonate. The resulting solution was uniformly coated on each of the layers of the negative electrode active material and the positive electrode active material for impregnation. The resulting product was allowed to stand at ambient temperature for eight hours to vaporize diethyl carbonate off to prepare a gelated electrolyte.

Finally, the layers of the positive and negative electrode active materials, coated with the gelated electrolyte, were press-fitted to each other, with the surfaces carrying the gelated electrolyte facing each other, to fabricate a flat-plate-shaped gelated electrolyte cell, 2.5 cm×4.0 cm×0.3 mm in size.

EXAMPLE 10

A flat-plate-shaped gelated electrolyte cell was fabricated by a method similar to one used in Example 8, except adding $TiO_2$, in place of $BaTiO_3$, to the plasticizer of the gelated electrolyte.

EXAMPLE 11

A flat-plate-shaped gelated electrolyte cell was fabricated by a method similar to one used in Example 7, except adding $TiO_2$, in place of $BaTiO_3$, to the plasticizer of the gelated electrolyte.

EXAMPLE 12

A flat-plate-shaped gelated electrolyte cell was fabricated by a method similar to one used in Example 8, except using poly(ethylene oxide/propylene oxide) copolymer (P(EO/PO)), having a molecular weight of 800000, in place of the poly(vinylidene fluoride-co-hexafluoropropylene) copolymer, with a molecular weight of 600000, as a matrix polymer of the gelated electrolyte.

EXAMPLE 13

A flat-plate-shaped gelated electrolyte cell was fabricated by a method similar to one used in Example 8, except using polyethylene oxide (PEO) in place of the poly(vinylidene fluoride-co-hexafluoropropylene) copolymer, with a molecular weight of 600000, as a matrix polymer of the gelated electrolyte.

EXAMPLE 14

A flat-plate-shaped gelated electrolyte cell was fabricated by a method similar to one used in Example 7, except using polyacrylonitrile, with a molecular weight of 850000, in place of the poly(vinylidene fluoride-co-hexafluoropropylene) block copolymer, with a molecular weight of 600000, as a matrix polymer of the gelated electrolyte.

EXAMPLE 15

A flat-plate-shaped gelated electrolyte cell was fabricated by a method similar to one used in Example 7, except using polymethacrylonitrile, with a molecular weight of 800000, in place of the poly(vinylidene fluoride-co-hexafluoropropylene) block copolymer, with a molecular weight of 600000, as a matrix polymer of the gelated electrolyte.

EXAMPLE 16

A flat-plate-shaped gelated electrolyte cell was fabricated by a method similar to one used in Example 7, except using equimolar amounts of $LiBF_4$ and $LiN(C_2F_5SO_2)_2$ in place of $LiPF_6$ as an electrolytic salt of the gelated electrolyte, as an electrolytic salt of the gelated electrolyte.

EXAMPLE 17

A flat-plate-shaped gelated electrolyte cell was fabricated by a method similar to one used in Example 7, except using $LiN(SO_2CF_5)_2$ in place of $LiPF_6$ as an electrolytic salt of the gelated electrolyte.

EXAMPLE 18

First, the layers of the positive and negative electrode active materials were prepared by a method similar to the method of Example 17.

A gelated electrolyte then was prepared. 4.5 parts by weight of ethylene carbonate (EC), 12 parts by weight of propylene carbonate (PC) and 3.3 parts by weight of $LiPF_6$ were mixed together to prepare a plasticizer, to which 12 parts by weight of $BaTiO_3$ were added and dispersed evenly. To the resulting product were mixed and dissolved 10 parts by weight of a poly(vinylidene fluoride-co-hexafluoropropylene) copolymer, with a molecular weight of 600000, and 60 parts by weight of diethyl carbonate. The resulting solution was uniformly coated on one surface of each of the layers of the negative electrode active material and the positive electrode active material for impregnation. The resulting product was allowed to stand at ambient temperature for eight hours to vaporize diethyl carbonate off to prepare a gelated electrolyte.

Finally, the layers of the positive and negative electrode active materials, coated with the gelated electrolyte, were press-fitted to each other, with the surfaces carrying the gelated electrolyte facing each other, to fabricate a flat-plate-shaped gelated electrolyte cell, 2.5 cm×4.0 cm×0.3 mm in size.

EXAMPLE 19

First, the layers of the positive and negative electrode active materials were prepared by a method similar to one used in Example 7.

Next, a gelated electrolyte was fabricated. First, 4.5 parts by weight of ethylene carbonate (EC), 4.5 parts by weight of propylene carbonate (PC) and 12 parts by weight of $LiPF_6$ were mixed together to give a plasticizer, to which 3 parts by weight of $BaTiO_3$ were added and dispersed uniformly. To the resulting product were mixed and dissolved 10 parts by weight of a poly(vinylidene fluoride-co-hexafluoropropylene) copolymer, with a molecular weight of 600000, and 60 parts by weight of diethyl carbonate. The resulting solution was uniformly coated on each of the layers of the negative electrode active material and the positive electrode active material for impregnation. The resulting product was allowed to stand at ambient temperature for eight hours to vaporize diethyl carbonate off to prepare a gelated electrolyte.

Finally, the layers of the positive and negative electrode active materials, coated with the gelated electrolyte, were press-fitted to each other, with the surfaces carrying the gelated electrolyte facing each other, to fabricate a flat-plate-shaped gelated electrolyte cell, 2.5 cm×4.0 cm×0.3 mm in size.

EXAMPLE 20

A flat-plate-shaped gelated electrolyte cell was fabricated by a method similar to one used in Example 7, except adding BaO, in place of $BaTiO_3$, to the plasticizer of the gelated electrolyte.

Comparative Example 5

In producing a gelated electrolyte, 13 parts by weight of ethylene carbonate (EC), 13 parts by weight of propylene carbonate (PC) and 4 parts by weight of $LiPF_6$ as an electrolytic salt were mixed together to form a plasticizer. $BaTiO_3$ was not added at this time. A flat-plate-shaped gelated electrolyte cell was prepared by otherwise the same method as in Example 7.

Comparative Example 6

A flat-plate-shaped gelated electrolyte cell was prepared by a method similar to one used in Comparative Example 5 except using a poly(ethylene oxide/propylene oxide) copolymer (P(EO/PO)), with a molecular weight of 800000, in place of a poly(vinylidene fluoride-co-hexafluoropropylene) block copolymer, with a molecular weight of 600000, as a matrix polymer of the gelated electrolyte.

Comparative Example 7

A flat-plate-shaped gelated electrolyte cell was prepared by a method similar to one used in Comparative Example 5 except using a polyacrylonitrile (PAN), with a molecular weight of 850000, in place of a poly(vinylidene fluoride-co-hexafluoropropylene) block copolymer, with a molecular weight of 600000, as a matrix polymer of the gelated electrolyte.

Comparative Example 8

A flat-plate-shaped gelated electrolyte cell was prepared by a method similar to one used in Comparative Example 5, except using a polymethacrylonitrile, with a molecular weight of 800000, in place of a poly(vinylidene fluoride-co-hexafluoropropylene) block copolymer, with a molecular weight of 600000, as a matrix polymer of the gelated electrolyte.

Comparative Example 9

A flat-plate-shaped gelated electrolyte cell was prepared by a method similar to one used in Example 7 except adding $Al_2O_3$ to the plasticizer of the gelated electrolyte.

Comparative Example 10

A flat-plate-shaped gelated electrolyte cell was prepared by a method similar to one used in Example 16 except not adding $BaTiO_3$ to the plasticizer of the gelated electrolyte.

Comparative Example 11

A flat-plate-shaped gelated electrolyte cell was prepared by a method similar to one used in Example 17 except not adding $BaTiO_3$ to the plasticizer of the gelated electrolyte.

Comparative Example 12

A flat-plate-shaped gelated electrolyte cell was prepared by a method similar to one used in Example 18 except not adding $BaTiO_3$ to the plasticizer of the gelated electrolyte.

Comparative Example 13

A flat-plate-shaped gelated electrolyte cell was prepared by a method similar to one used in Example 19 except not adding $BaTiO_3$ to the plasticizer of the gelated electrolyte.

The cyclic service life, load characteristics and low-temperature characteristics were measured of the flat-plateshaped gelated electrolyte cells prepared in Examples 7 to 20 and in Comparative Examples 5 to 13, by a method shown below.

Cyclic Service Life 500 charging/discharging cyclic tests were carried out at a two-hour rate discharging (1/2C) of the theoretical capacity to make the following evaluations: First, a constant current constant voltage charging was carried out on each cell at 23° C., up to an upper limit of 4.2 V, for ten hours. The two-hour rate charging (1/2C) was then carried out to a terminal voltage of 3.2 V. The discharge capacity was decided in this manner and, from the average voltage, found therefrom, an output at the hour rate discharging was calculated as percentage value for the 5-hour rate discharging (1/5C) at an earlier time of the cyclic period.

Load Characteristics

A 1/3 hour rate discharging (3C) of the theoretical capacity was carried out to make the following evaluations: First, a constant current constant voltage charging was carried out on each cell at 23° C., up to an upper limit of 4.2 V, for ten hours. The 1/3-hour rate charging (3C) was then carried out to a terminal voltage of 3.2 V. The discharge capacity was decided in this manner and, from the average voltage, found therefrom, an output at the hour rate discharging was calculated as percentage value for the 5-hour rate discharging (1/5C) at an earlier time of the cyclic period.

Low-Temperature Characteristics

A two-hour rate discharging of the theoretical capacity (1/2C) was carried out at a lower temperature to make the following evaluations: First, a constant current constant voltage charging was carried out on each cell at 23° C., up to an upper limit of 4.2 V, for ten hours. The two-hour rate charging (1/2C) was then carried out at −20° C. to a terminal voltage of 3.2 V. The discharge capacity was decided in this manner and, from the average voltage, found therefrom, an output at the five hour rate discharging (1/5C) was calculated as percentage value for the 5-hour rate discharging (1/5C) at ambient temperature.

Table 2 below shows the results as measured of cyclic service life, load characteristics and low temperature characteristics of the Examples 7 to 20 and Comparative Examples 5 to 23:

TABLE 2

|  | cyclic characteristics (%) | load characteristics (%) | low temperature characteristics (%) |
|---|---|---|---|
| Ex. 7 | 93 | 86 | 72 |
| Ex. 8 | 91 | 82 | 68 |
| Ex. 9 | 91 | 79 | 64 |
| Ex. 10 | 91 | 83 | 67 |
| Ex. 11 | 91 | 82 | 66 |
| Ex. 12 | 84 | 78 | 61 |
| Ex. 13 | 84 | 76 | 58 |
| Ex. 14 | 88 | 78 | 61 |
| Ex. 15 | 89 | 80 | 61 |
| Ex. 16 | 91 | 83 | 75 |
| Ex. 17 | 91 | 81 | 74 |
| Ex. 18 | 89 | 82 | 78 |
| Ex. 19 | 86 | 80 | 77 |
| Ex. 20 | 89 | 74 | 61 |
| Comp. Ex. 5 | 89 | 71 | 58 |
| Comp. Ex. 6 | 82 | 70 | 52 |
| Comp. Ex. 7 | 86 | 70 | 56 |
| Comp. Ex. 8 | 86 | 71 | 55 |
| Comp. Ex. 9 | 89 | 68 | 57 |
| Comp. Ex. 10 | 89 | 75 | 64 |
| Comp. Ex. 11 | 89 | 73 | 61 |
| Comp. Ex. 12 | 85 | 71 | 73 |
| Comp. Ex. 13 | 84 | 70 | 68 |

It is seen from Table 2 that the Examples 8 and 9, in which 3 to 13.7 parts by weight of $BaTiO_3$ is contained in the gelated electrolyte, prepared using the block copolymer poly(vinylidene fluoride-co-hexafluoropropylene) as a matrix polymer, are superior to the Comparative Example 5 not containing $BaTiO_3$ in cyclic service life, load characteristics and low-temperature characteristics.

It is also seen that the Examples 4 and 11, in which 3 to 10.9 parts by weight of $TiO_2$ is contained in the gelated electrolyte, prepared using the block copolymer poly (vinylidene fluoride-co-hexafluoropropylene) as a matrix polymer, are superior to the Comparative Example 5 not containing $BaTiO_3$ in cyclic service life, load characteristics and low-temperature characteristics.

It is also seen that the Examples 12 and 13, in which the gelated electrolyte is prepared using polyethylene oxide as a matrix polymer, but which contains $BaTiO_3$ in an amount of 3 parts by weight, are superior to the Comparative Example 6 not containing $BaTiO_3$ in cyclic service life, load characteristics and low-temperature characteristics.

It is also seen that the Example 14, in which the gelated electrolyte is prepared using polyacrylonitrile as a matrix polymer, but which contains $BaTiO_3$ in an amount of 3 parts by weight, is superior to the Comparative Example 7 not containing $BaTiO_3$ in cyclic service life, load characteristics and low-temperature characteristics.

It is also seen that the Example 15, in which the gelated electrolyte is prepared using polymethacrylonitrile as a matrix polymer, but which contains $BaTiO_3$ in an amount of 3 parts by weight, is superior to the Comparative Example 8 not containing $BaTiO_3$ in cyclic service life, load characteristics and low-temperature characteristics.

It is also seen that the Example 16, in which the gelated electrolyte is prepared using a block copolymer poly (vinylidene fluoride-co-hexafluoropropylene) as a matrix polymer and also using $LiBF_4$ and $LiN(C_2F_5SO_2)_2$ as an electrolytic salt, but which contains $BaTiO_3$ in an amount of 3 parts by weight, is superior to the Comparative Example 10 not containing $BaTiO_3$ in cyclic service life, load characteristics and low-temperature characteristics.

It is also seen that the Example 16, in which the gelated electrolyte is prepared using a block copolymer poly (vinylidene fluoride -co-hexafluoropropylene) as a matrix polymer and also using $LiN(SO_2CF_3)_2$ as an electrolytic salt, but which contains $BaTiO_3$ in an amount of 3 parts by weight, is superior to the Comparative Example 11 not containing $BaTiO_3$ in cyclic service life, load characteristics and low-temperature characteristics.

It is also seen that the Example 18, in which the gelated electrolyte is prepared by adding diethyl carbonate to a plasticizer, but which contains $BaTiO_3$ in an amount of 3 parts by weight, is superior to the Comparative Example 12 not containing $BaTiO_3$ in cyclic service life, load characteristics and low-temperature characteristics.

It is also seen that the Example 19, in which the gelated electrolyte is prepared by adding dimethyl carbonate to a plasticizer, but which contains $BaTiO_3$ in an amount of 3 parts by weight, is superior to the Comparative Example 13 not containing $BaTiO_3$ in cyclic service life, load characteristics and low-temperature characteristics.

It is also seen that the Example 20, in which BaO is contained in an amount of 3 parts by weight in the gelated electrolyte prepared using a block copolymer poly (vinylidene fluoride-co-hexafluoropropylene) as a matrix polymer, is superior to the Comparative Example 5 not containing BaO in cyclic service life, load characteristics and low-temperature characteristics.

It is also seen that the Example 20, in which $Al_2O_3$ is contained in an amount of 3 parts by weight in the gelated electrolyte prepared using a block copolymer poly (vinylidene fluoride-co-hexafluoropropylene) as a matrix polymer, is inferior to the Comparative Example 7 containing $BaTiO_3$ in cyclic service life, load characteristics and low-temperature characteristics.

Non-Aqueous Electrolyte Cell Containing an Inorganic Compound in a Non-Aqueous Electrolyte

EXAMPLE 21

First, a layer of a negative electrode active material was prepared. First, 90 parts by weight of graphite powders and 10 parts by weight of polyvinylidene fluoride, as a binder, were mixed together to prepare a negative electrode mixture. The negative electrode mixture, so prepared, was dispersed in N-methyl-2-pyrrolidone to form a slurry. This slurry then was coated evenly on one surface of a strip-shaped copper foil, which later proves a current collector for the negative electrode. The resulting product was dried in situ and was compression-molded in a roll press to fabricate a layer of the negative electrode active material.

A layer of the positive electrode active material then was prepared. First, $LiCO_3$ and $CoCO_3$ were mixed at a molar ratio of 0.5 to 1.0. The resulting mixture was then fired in air at 900° C. for five hours to fabricate $LiCoO_2$, which then was mixed with 91 parts by weight of $LiCoO_2$, 6 parts by weight of graphite, as an electrification agent, and 3 parts by weight of polyvinylidene fluoride, as a binder, to form a positive electrode mixture. This positive electrode mixture was then dispersed in N-methyl-2-pyrrolidone to form a slurry, which then was evenly coated on one surface of a strip-like aluminum foil, 20 µm in thickness, which later proves a positive electrode current collector. The resulting product was dried in situ and compression-molded in a roll press to give a layer of a positive electrode active material.

A non-aqueous electrolyte then was prepared. 15 parts by weight of ethylene carbonate (EC), 15 parts by weight of propylene carbonate (PC), 2 parts by weight of diethyl carbonate and 10 parts by weight of $LiPF_6$, as an electrolytic salt, were mixed together and added to with 10 parts by weight of $BaTiO_3$. The resulting mass was dispersed uniformly to form a non-aqueous electrolyte.

Finally, the layers of the positive electrode active material and the negative electrode active material were press-fitted to each other via a separator to form a coiled product, which was then accommodated in a cell can. Into this can was poured a non-aqueous electrolyte to complete a non-aqueous electrolyte cell.

EXAMPLE 22

First, a layer of the positive electrode active material and a layer of a negative electrode active material were prepared in the same way as in Example 21.

A non-aqueous electrolyte then was prepared. 10 parts by weight of ethylene carbonate (EC), 10 parts by weight of propylene carbonate (PC), 26.7 parts by weight of diethyl carbonate and 13.3 parts by weight of $LiPF_6$, as an electrolytic salt, were mixed together and added to with 40 parts by weight of $BaTiO_3$. The resulting mass was dispersed uniformly to form a non-aqueous electrolyte.

Finally, the layers of the positive and negative electrode active materials were press-fitted to each other via a separator to form a coiled set, which was then accommodated in a cell can. Into this can was poured a non-aqueous electrolyte to complete a non-aqueous electrolyte cell.

EXAMPLE 23

First, a layer of the positive electrode active material and a layer of a negative electrode active material were prepared in the same way as in Example 21.

A non-aqueous electrolyte then was prepared. 3.3 parts by weight of ethylene carbonate (EC), 10 parts by weight of propylene carbonate (PC), 9 parts by weight of diethyl carbonate and 4.4 parts by weight of $LiPF_6$, as an electrolytic salt, were mixed together and added to with 80 parts by weight of $BaTiO_3$. The resulting mass was dispersed uniformly to form a non-aqueous electrolyte.

Finally, the layers of the positive electrode active material and the negative electrode active material were press-fitted to each other via a separator to form a coiled product, which was then accommodated in a cell can. Into this can was poured a non-aqueous electrolyte to complete a non-aqueous electrolyte cell.

EXAMPLE 24

First, a layer of the positive electrode active material and a layer of a negative electrode active material were prepared in the same way as in Example 21.

A non-aqueous electrolyte then was prepared. 15 parts by weight of ethylene carbonate (EC), 15 parts by weight of propylene carbonate (PC), 40 parts by weight of diethyl carbonate and 20 parts by weight of $LiPF_6$, as an electrolytic salt, were mixed together and added to with 10 parts by weight of $TiO_2$. The resulting mass was dispersed uniformly to form a non-aqueous electrolyte.

Finally, the layers of the positive electrode active material and the negative electrode active material were press-fitted to each other via a separator to form a coiled product, which was then accommodated in a cell can. Into this can was poured a non-aqueous electrolyte to complete a non-aqueous electrolyte cell.

EXAMPLE 25

First, a layer of the positive electrode active material and a layer of a negative electrode active material were prepared in the same way as in Example 21.

A non-aqueous electrolyte then was prepared. 10 parts by weight of ethylene carbonate (EC), 10 parts by weight of propylene carbonate (PC), 26.7 parts by weight of diethyl carbonate and 20 parts by weight of $LiPF_6$, as an electrolytic salt, were mixed together and added to with 40 parts by weight of $TiO_2$. The resulting mass was dispersed uniformly to form a non-aqueous electrolyte.

Finally, the layers of the positive electrode active material and the negative electrode active material were press-fitted to each other via a separator to form a coiled set, which was then accommodated in a cell can. Into this can was poured a non-aqueous electrolyte to complete a non-aqueous electrolyte cell.

EXAMPLE 26

A non-aqueous electrolyte cell was prepared in the same way as in Example 21 except adding equimolar amounts of $LiBF_4$ and $LiN(C_2F_5SO_2)_2$ in place of $LiPF_6$ as an electrolytic salt for the non-aqueous electrolyte.

EXAMPLE 27

A non-aqueous electrolyte cell was prepared in the same way as in Example 21 except adding equimolar amounts of $LiN(SO_2CF_5)_2$ in place of $LiPF_6$ as an electrolytic salt for the non-aqueous electrolyte.

EXAMPLE 28

First, a layer of the positive electrode active material and a layer of a negative electrode active material were prepared in the same way as in Example 21.

A non-aqueous electrolyte then was prepared. 5 parts by weight of ethylene carbonate (EC), 10 parts by weight of propylene carbonate (PC), 55 parts by weight of ethylmethyl carbonate and 20 parts by weight of $LiPF_6$, as an electrolytic salt, were mixed together and added to with 10 parts by weight of $TiO_2$. The resulting mass was dispersed uniformly to form a non-aqueous electrolyte.

Finally, the layers of the positive and negative electrode active materials were press-fitted to each other via a separator to form a coiled product, which was then accommodated in a cell can. Into this can was poured a non-aqueous electrolyte to complete a non-aqueous electrolyte cell.

EXAMPLE 29

A non-aqueous electrolyte cell was prepared in the same way as in Example 21.

A non-aqueous electrolyte then was prepared. 15 parts by weight of ethylene carbonate (EC), 15 parts by weight of propylene carbonate (PC), 40 parts by weight of diethyl carbonate and 20 parts by weight of $LiPF_6$, as an electrolytic salt, were mixed together and added to with 10 parts by weight of BaO. The resulting mass was dispersed uniformly to form a non-aqueous electrolyte.

Finally, the layers of the positive electrode active material and the negative electrode active material were press-fitted to each other via a separator to form a coiled product, which was then accommodated in a cell can. Into this can was poured a non-aqueous electrolyte to complete a non-aqueous electrolyte cell.

Comparative Example 14

A layer of a positive electrode active material and a layer of the negative electrode active material were prepared in the same way as in Example 21.

A non-aqueous electrolyte then was prepared. 16.7 parts by weight of ethylene carbonate (EC), 16.7 parts by weight of propylene carbonate (PC), 44.4 parts by weight of diethyl carbonate and 22.2 parts by weight of $LiPF_6$, as an electrolytic salt, were mixed together to form a non-aqueous electrolyte.

Finally, the layers of the positive and negative electrode active materials were press-fitted to each other via a separator to form a coiled product, which was then accommodated in a cell can. Into this can was poured a non-aqueous electrolyte to complete a non-aqueous electrolyte cell.

Comparative Example 15

A non-aqueous electrolyte cell was prepared in the same way as in Example 21 except adding $Al_2O_3$ in place of $BaTiO_3$ to the non-aqueous electrolyte.

Comparative Example 16

An non-aqueous electrolyte cell was prepared in the same way as in Comparative Example 14 except adding a mixture of equimolar amounts of $LiBF_4$ and $LiN(C_2F_5SO_2)_2$ in place of $LiPF_6$ as an electrolytic salt of the non-aqueous electrolyte.

Comparative Example 17

An non-aqueous electrolyte cell was prepared in the same way as in Comparative Example 21 except adding $LiN(SO_2CF_5)_2$ in place of $LiPF_6$ as the electrolytic salt of the non-aqueous electrolyte.

Comparative Example 18

A layer of a positive electrode active material and a layer of the negative electrode active material were prepared in the same way as in Example 21.

A non-aqueous electrolyte then was prepared. 5.6 parts by weight of ethylene carbonate (EC), 11.1 parts by weight of propylene carbonate (PC), 61.1 parts by weight of ethylmethyl carbonate and 22.2 parts by weight of $LiPF_6$, as an electrolytic salt, were mixed together to form a non-aqueous electrolyte.

Finally, the layers of the positive and negative electrode active materials were press-fitted to each other, via a separator, to form a coiled set, which was then accommodated in a cell can. Into this can was poured a non-aqueous electrolyte to complete a non-aqueous electrolyte cell.

Of the non-aqueous electrolyte cells, prepared by Examples 21 and Comparative Examples 14, to 18, the cyclic service life, heavy load characteristics and low-temperature characteristics were measured by the following method:

Cyclic Service Life 500 charging/discharging cyclic tests were conducted at the two-hour rate discharging (1/2C) of the theoretical capacity to make following evaluations: First, constant-current constant-voltage charging was carried out at 23° C. for ten hours up to an upper limit of 4.2 V. Then, two-hour rate discharging (1/2C) was carried out up to the terminal voltage of 3.2 V. The discharge capacity was decided in this manner and, from the average voltage, found therefrom, an output at the hour rate discharging was calculated as percentage value for the 5-hour rate discharging (1/5C) at an earlier time of the cyclic period.

Load Characteristics

A 1/3 hour rate discharging (3C) of the theoretical capacity was carried out to make the following evaluations: First, a constant current constant voltage charging was carried out on each cell at 23° C., up to an upper limit of 4.2 V, for ten hours. The 1/3-hour rate charging (3C) was then carried out to a terminal voltage of 3.2 V. The discharge capacity was decided in this manner and, from the average voltage, found therefrom, an output at each hour rate discharging was calculated as percentage value for the 5-hour rate discharging (1/5C).

Low-Temperature Characteristics

Two-hour rate discharging of the theoretical capacity (1/2 C) was carried out at lower temperatures to make the following evaluations: First, constant current constant voltage charging was carried out for each cell at 23° C. for ten hours up to an upper limit of 4.2 V. Then, two hour rate discharging (1/2 C) was carried out at −20° C. up to a terminal voltage of 3.2 V. From the average voltage, found therefrom, an output at the hour rate discharging was calculated as a percentage to the 5-hour rate discharging at ambient temperature (23° C.).

The following Table 3 shows measured results of the cyclic service life, heavy load characteristics and low-temperature characteristics of the above-described Examples 21 to 29 and Comparative Examples 14 to 18:

TABLE 3

|  | cyclic service life (%) | load characteristics (%) | low temperature characteristics (%) |
|---|---|---|---|
| Ex. 21 | 88 | 75 | 81 |
| Ex. 22 | 85 | 67 | 76 |
| Ex. 23 | 85 | 65 | 77 |
| Ex. 24 | 86 | 71 | 77 |
| Ex. 25 | 85 | 68 | 58 |
| Ex. 26 | 85 | 64 | 73 |
| Ex. 27 | 89 | 82 | 83 |
| Ex. 28 | 85 | 64 | 82 |
| Ex. 29 | 85 | 63 | 72 |
| Comp. Ex. 14 | 85 | 60 | 70 |
| Comp. Ex. 15 | 85 | 55 | 46 |
| Comp. Ex. 16 | 86 | 73 | 74 |
| Comp. Ex. 17 | 85 | 70 | 76 |
| Comp. Ex. 18 | 85 | 62 | 76 |

It is seen from Table 3 that the Examples 21 to 23, containing 10 to 80 parts by weight of $BaTiO_3$ in the non-aqueous electrolyte, are superior to the Comparative Example 14 not containing $BaTiO_3$ in cyclic service life, heavy load characteristics and in low temperature characteristics.

It is also seen that the Examples 24 and 25, containing 10 to 40 parts by weight of $TiO_2$ in the non-aqueous electrolyte, are superior to the Comparative Example 14 not containing $TiO_2$ in cyclic service life, heavy load characteristics and in low temperature characteristics.

It is also seen that the Example 26 in which a mixture of $LiBF_4$ and $LiN(C_2F_5SO_2)_2$ is used as an electrolytic salt in the preparation of the non-aqueous electrolyte, but which contains 10 parts by weight of $BaTiO_3$, is superior to the Comparative Example 16 not containing $BaTiO_3$ in cyclic service life, heavy load characteristics and in low temperature characteristics.

It is also seen that the Example 27 in which $LiN(SO_2CF_3)_2$ is used as an electrolytic salt in the preparation of the non-aqueous electrolyte, but which contains 10 parts by weight of $BaTiO_3$, is superior to the Comparative Example 17 not containing $BaTiO_3$ in cyclic service life, heavy load characteristics and in low temperature characteristics.

It is also seen that the Example 28 in which ethylmethyl carbonate is mixed into the non-aqueous electrolyte but which contains 10 parts by weight of $BaTiO_3$ in the non-aqueous electrolyte is superior to the Comparative Example 18 not containing $BaTiO_3$ in cyclic service life, heavy load characteristics and in low temperature characteristics.

It is also seen that the Example 29 containing 10 parts by weight of BaO is superior to the Comparative Example 14 not containing $BaTiO_3$ in cyclic service life, heavy load characteristics and in low temperature characteristics.

Non-Aqueous Electrolyte Cell Containing an Inorganic Compound in an Electrode

EXAMPLE 30

First, a negative electrode was prepared. 80 parts by weight of pulverized graphite powders and 10 parts by weight of polyvinylidene fluoride, as a binder, were mixed together to form a negative electrode mixture. This negative electrode mixture then was dispersed in N-methyl pyrrolidone to form a slurry, into which 10 parts by weight of $BaTiO_3$ was added and dispersed evenly. The resulting product was then coated uniformly on one surface of a strip-shaped copper foil, 10 μm in thickness, which later proves a negative electrode current collector. The resulting product then was dried and compression-molded in a roll press to form a layer of a negative electrode.

A positive electrode then was prepared. First, $LiCO_3$ and $CoCO_3$ were mixed together, at a molar ratio of 0.5 to 1.0, and sintered in air at 900° C. for five hours to form $LiCoO_2$. 86 parts by weight of this $LiCoO_2$, 6 parts by weight of graphite, as an electrification agent, and 3 parts by weight of polyvinylidene fluoride, as a binder, were mixed together to form a positive electrode mixture. This positive electrode mixture then was dispersed in N-methyl pyrrolidone to form a slurry, into which 10 parts by weight of $BaTiO_3$ was added and dispersed evenly. The resulting mass was then coated uniformly on one surface of a strip-shaped aluminum foil, 20 μm in thickness, which later proves a positive electrode current collector. The resulting product then was dried and compression-molded in a roll press to form a layer of a positive electrode active material.

The non-aqueous electrolyte then was prepared. 15 parts by weight of ethylene carbonate (EC), 15 parts by weight of propylene carbonate (PC), 50 parts by weight of diethyl carbonate and 20 parts by weight of $LiPF_6$, as an electrolytic salt, were mixed together to form a non-aqueous electrolyte.

Finally, the positive and negative electrodes are press-fitted together via a separator formed by a microporous polypropylene film to form a coiled product, which then was housed in a cell can. A non-aqueous electrolyte then was poured into the can to complete a non-aqueous electrolyte cell.

EXAMPLE 31

First, a negative electrode was prepared. 71.1 parts by weight of pulverized graphite powders and 8.9 parts by weight of polyvinylidene fluoride, as a binder, were mixed together to form a negative electrode mixture. This negative electrode mixture then was dispersed in N-methyl pyrrolidone to form a slurry, into which 20 parts by weight of $BaTiO_3$ was added and dispersed evenly. The resulting product was then coated uniformly on one surface of a strip-shaped copper foil, 10 μm in thickness, which later proves a negative electrode current collector. The resulting product then was dried and compression-molded in a roll press to form a layer of a negative electrode.

A positive electrode then was prepared. First, $LiCO_3$ and $CoCO_3$ were mixed together, at a molar ratio of 0.5 to 1.0, and sintered in air at 900° C. for five hours to form $LiCoO_2$. 72.4 parts by weight of this $LiCoO_2$, 5.1 parts by weight of graphite, as an electrification agent, and 2.5 parts by weight of polyvinylidene fluoride, as a binder, were mixed together to form a positive electrode mixture. This positive electrode mixture then was dispersed in N-methyl pyrrolidone to form a slurry, into which 10 parts by weight of $BaTiO_3$ was added and dispersed evenly. The resulting mass was then coated uniformly on one surface of a strip-shaped aluminum foil, 20 μm in thickness, which later proves a positive electrode current collector. The resulting product then was dried and compression-molded in a roll press to form a layer of a positive electrode active material.

The non-aqueous electrolyte then was prepared. 15 parts by weight of ethylene carbonate (EC), 15 parts by weight of propylene carbonate (PC), 50 parts by weight of diethyl carbonate and 20 parts by weight of $LiPF_6$, as an electrolytic salt, were mixed together to form a non-aqueous electrolyte.

Finally, the positive and negative electrodes were press-fitted together via a separator formed by a microporous polypropylene film to form a coiled product, which then was housed in a cell can. A non-aqueous electrolyte then was poured into the can to complete a non-aqueous electrolyte cell.

EXAMPLE 32

A non-aqueous electrolyte cell was prepared by a method similar to one used in Example 30, except adding $TiO_2$, in place of $BaTiO_3$, to the positive and negative electrode active materials.

EXAMPLE 33

A non-aqueous electrolyte cell was prepared by a method similar to one used in Example 30, except mixing, in preparing a negative electrode, 90 parts by weight of the pulverized graphite powders and 10 parts by weight of polyvinylidene fluoride, as a binder.

EXAMPLE 34

A non-aqueous electrolyte cell was prepared by a method similar to one used in Example 30, except mixing, in the preparation of the non-aqueous electrolyte cell, 90.5 parts by weight of $LiCoO_2$, 6.3 parts by weight of graphite, as an electrification agent, 3.2 parts by weight of polyvinylidene fluoride, as a binder.

EXAMPLE 35

A non-aqueous electrolyte cell was prepared by a method similar to one used in Example 30, except adding BaO, in place of $BaTiO_3$, to the to the positive and negative electrode active materials.

EXAMPLE 36

First, positive and negative electrode active materials were prepared in the same way as in Example 30.

Next, a gelated electrolyte was fabricated. First, 12 parts by weight of ethylene carbonate (EC), 12 parts by weight of propylene carbonate (PC) and 6 parts by weight of $LiPF_6$, as an electrolytic salt, were mixed together to give a plasticizer, to which were added 10 parts by weight of a poly(vinylidene fluoride-co-hexafluoropropylene) copolymer, with a molecular weight of 600000, and 60 parts by weight of diethyl carbonate. The resulting solution was uniformly coated on one surface of each of the negative electrode active material and the positive electrode active material for impregnation. The resulting product was allowed to stand at ambient temperature for eight hours to vaporize diethyl carbonate off to prepare a gelated electrolyte.

Finally, the layers of the positive and negative electrode active materials, coated with the gelated electrolyte, were press-fitted to each other, with the surfaces carrying the gelated electrolyte facing each other, to fabricate a cell element, which was then accommodated in an exterior film to form a gelated electrolyte cell 2.5 cm×4.0 cm×0.3 mm in size.

EXAMPLE 37

A non-aqueous electrolyte cell was prepared in the same way as in Example 30, except using $Mg_2Si$ in place of graphite powders in the positive electrode active material.

Comparative Example 19

First, a negative electrode was prepared. 90 parts by weight of pulverized graphite powders and 10 parts by weight of polyvinylidene fluoride, as a binder, were mixed together to form a negative electrode mixture. This negative electrode mixture then was dispersed in N-methyl pyrrolidone to form a slurry. This slurry was then coated uniformly on one surface of a strip-shaped copper foil, 10 μm in thickness, which later proves a negative electrode current collector. The resulting product then was dried and compression-molded in a roll press to form a layer of a negative electrode.

A positive electrode then was prepared. First, $LiCO_3$ and $CoCO_3$ were mixed together, at a molar ratio of 0.5 to 1.0, and sintered in air at 900° C. for five hours to form $LiCoO_2$. 90.5 parts by weight of this $LiCoO_2$, 6.3 parts by weight of graphite, as an electrification agent, and 3.2 parts by weight of polyvinylidene fluoride, as a binder, were mixed together to form a positive electrode mixture. This positive electrode mixture then was dispersed in N-methyl-2-pyrrolidone to form a slurry, into which 10 parts by weight of $BaTiO_3$ was added and dispersed evenly. The resulting mass was then coated uniformly on one surface of a strip-shaped aluminum foil, 20 μm in thickness, which later proves a positive electrode current collector. The resulting product then was dried and compression-molded in a roll press to form a layer of a positive electrode.

The non-aqueous electrolyte then was prepared. 15 parts by weight of ethylene carbonate (EC), 15 parts by weight of propylene carbonate (PC), 50 parts by weight of diethyl carbonate and 20 parts by weight of $LiPF_6$, as an electrolytic salt, were mixed together to form a non-aqueous electrolyte.

Finally, the positive and negative electrodes were press-fitted together via a separator formed by a microporous polypropylene film to form a coiled product, which then was housed in a cell can. A non-aqueous electrolyte then was poured into the can to complete a non-aqueous electrolyte cell.

Comparative Example 20

A non-aqueous electrolyte cell was prepared in the same way as in Example 30 except adding $Al_2O_3$, in place of $BaTiO_3$, to the positive and negative electrode active materials.

Comparative Example 21

First, positive and negative electrode active materials were prepared in the same way as in Comparative Example 19.

Next, a gelated electrolyte was fabricated in the same way as in Example 7. Finally, a cell element was formed by a method similar to one used in Example 7 and was accommodated in an exterior film to complete a gelated electrolyte cell 2.5 cm×4.0 cm×0.3 mm in size.

Comparative Example 22

A non-aqueous electrolyte cell was prepared in the same way as in Comparative Example 19 except adding $Mg_2Si$ in place of graphite powders in the positive electrode active material.

Of the non-aqueous electrolyte cells, prepared in Examples 30 to 37 and in Comparative Examples 19 to 22, the cyclic service life, heavy load characteristics and low temperature characteristics were measured by the following method:

Cyclic Service Life 500 charging/discharging cycle tests were carried out at a two-hour rate discharging of the theoretical capacity (1/2C) to make the following evaluations: First, constant current constant voltage charging was carried out for each cell at 23° C. for ten hours up to an upper limit of 4.2 V. Then, two hour rate discharging (1/2C) was carried out up to a terminal voltage of 3.2 V. The discharge capacity was determined in this manner. From the average voltage, found therefrom, an output at the hour rate discharging was calculated as a percentage to the 5-hour rate discharging (1/5C) at an earlier time point in the cyclic period.

Load Characteristics

The 1/3 hour rate discharging (3C) of the theoretical capacity was carried out to make the following evaluations: First, constant current constant voltage charging was carried out for each cell at 23° C. for ten hours up to an upper limit of 4.2 V. Then, 1/3 hour rate discharging (3C) was carried out up to a terminal voltage of 3.2 V. The discharge capacity was determined in this manner. From the average voltage, found therefrom, an output at the hour rate discharging was calculated as a percentage to the 5-hour rate discharging (1/5C).

Low-Temperature Characteristics

The two hour rate discharging (1/2C) of the theoretical capacity was carried out to make the following evaluations: First, constant current constant voltage charging was carried out for each cell at 23° C. for ten hours up to an upper limit of 4.2 V. Then, two hour rate discharging (1/2C) was carried out at −20° C. up to a terminal voltage of 3.2 V. From the average voltage, found therefrom, an output at the hour rate discharging was calculated as a percentage to the five hour rate discharging (1/5C) at an ambient temperature (23° C.).

The following Table 4 shows measured results of the cyclic service life, heavy load characteristics and low-temperature characteristics of the above-described Examples 30 to 37 and Comparative Examples 19 to 22:

TABLE 4

| | cyclic characteristics (%) | load characteristics (%) | low temperature characteristics (%) |
| --- | --- | --- | --- |
| Ex. 30 | 88 | 73 | 77 |
| Ex. 31 | 89 | 66 | 75 |
| Ex. 32 | 86 | 72 | 74 |
| Ex. 33 | 87 | 68 | 73 |
| Ex. 34 | 87 | 63 | 71 |
| Ex. 35 | 85 | 63 | 72 |
| Ex. 36 | 92 | 81 | 64 |
| Ex. 37 | 70 | 71 | 66 |
| Comp. Ex. 19 | 85 | 60 | 70 |
| Comp. Ex. 20 | 89 | 73 | 60 |
| Comp. Ex. 21 | 89 | 71 | 57 |
| Comp. Ex. 22 | 89 | 71 | 58 |

It is seen from Table 4 that the Examples 30 and 31, containing 5 to 20 parts by weight of $BaTiO_3$ in the positive electrode active material and also containing 10 to 20 parts by weight of $BaTiO_3$ in the negative electrode active material, have been improved in cyclic service life, heavy load characteristics and low-temperature characteristics over the Comparative Example 19 not containing $BaTiO_3$.

It is also seen that the Example 32, containing 5 parts by weight of $TiO_2$ in the positive electrode active material and also containing 10 parts by weight of $TiO_2$ in the negative electrode active material, has been improved in cyclic service life, heavy load characteristics and low-temperature characteristics over the Comparative Example 19 not containing $TiO_2$.

It is also seen that the Example 33, containing 5 parts by weight of $BaTiO_3$ in the positive electrode active material, has been improved in cyclic service life, heavy load characteristics and low-temperature characteristics over the Comparative Example 19 not containing $BaTiO_3$.

It is also seen that the Example 34, containing 10 parts by weight of $BaTiO_3$ only in the negative electrode active material has been improved in cyclic service life, heavy load characteristics and low-temperature characteristics over the Comparative Example 19 not containing $BaTiO_3$.

It is also seen that the Example 35, containing 5 parts by weight of BaO in the positive electrode active material and also containing 10 parts by weight of BaO in the negative electrode active material, has been improved in cyclic service life, heavy load characteristics and low-temperature characteristics over the Comparative Example 19 not containing $TiO_2$.

It is also seen that the Example 36, containing 5 parts by weight of $BaTiO_3$ in the positive electrode active material and also containing 10 parts by weight of $BaTiO_3$ in the negative electrode active material, has been improved in cyclic service life, heavy load characteristics and low-temperature characteristics over the Comparative Example 21 not containing $BaTiO_3$.

It is likewise seen that the Example 37, containing 5 parts by weight of $BaTiO_3$ in the positive electrode active material and also containing Mg2Si in place of graphite powders in the positive electrode active material, has been improved in cyclic service life, heavy load characteristics and low-temperature characteristics over the Comparative Example 22 not containing $BaTiO_3$.

On the other hand, it is seen that the Comparative Example 20, containing 5 parts by weight of $Al_2O_3$, with the specific inductive capacity less than 12, in the positive electrode active material, and also containing 10 parts by weight of $Al_2O_3$, with the specific inductive capacity less than 12 in the negative electrode active material, has been lowered in cyclic service life, heavy load characteristics and low-temperature characteristics over the Example 30 containing $BaTiO_3$.

What is claimed is:

1. A separator containing an inorganic compound having a specific inductive capacity not lower than 12, wherein said inorganic compound exhibits paraelectricity.

2. A separator containing an inorganic compound having a specific inductive capacity not lower than 12;

wherein the separator is formed of a high molecular material containing at least one of olefin and vinylidene fluoride as a repetitive unit.

3. A non-aqueous electrolyte cell comprising:

a negative electrode, a positive electrode, a non-aqueous electrolyte and a separator, wherein said separator contains an inorganic compound having a specific inductive capacity not lower than 12; and wherein said inorganic compound exhibits paraelectricity.

4. The non-aqueous electrolyte cell according to claim 3 wherein said negative electrode contains a substance capable of doping/undoping lithium, as an active material; and wherein said positive electrode contains a lithium compound oxide as an active material.

5. The non-aqueous electrolyte cell according to claim 3 wherein said non-aqueous electrolyte contains at least one selected from the group consisting of $LiPF_6$, $LiBF_4$, $LiN(C_2F_5SO_2)_2$, $LiN(CF_3SO_2)_2$ and $LiCF_3SO_3$.

6. A gelated electrolyte obtained on gelating a non-aqueous electrolyte solution obtained in turn on dissolving an Li-containing electrolyte salt in a non-aqueous solvent, wherein the gelated electrolyte contains an inorganic compound having a specific inductive capacity not lower than 12; and wherein said inorganic compound exhibits paraelectricity.

7. The gelated electrolyte according to claim 6, wherein at least one selected from the group consisting of $LiPF_6$, $LiBF_4$, $LiN(C_2F_5SO_2)_2$, $LiN(CF_3SO_2)_2$ and $LiCF_3SO_3$ is contained as the electrolytic salt.

8. A non-aqueous electrolyte cell comprising a negative electrode, a positive electrode and a gelated electrolyte; wherein said gelated electrolyte contains an inorganic compound having a specific inductive capacity not lower than 12; wherein said inorganic compound exhibits paraelectricity.

9. The non-aqueous electrolyte cell according to claim 8, wherein said negative electrode contains a substance capable of doping/undoping lithium as an active material; and wherein said positive electrode contains a lithium compound oxide as an active material.

10. The non-aqueous electrolyte cell according to claim 8, wherein said non-aqueous electrolyte contains at least one selected from the group consisting of $LiPF_6$, $LiBF_4$, $LiN(C_2F_5SO_2)_2$, $LiN(CF_3SO_2)_2$ and $LiCF_3SO_3$.

11. A non-aqueous electrolyte containing a non-aqueous solvent, an Li-containing electrolytic salt and an inorganic compound having a specific inductive capacity not lower than 12; wherein said inorganic compound exhibits paraelectricity.

12. The gelated electrolyte according to claim 11, wherein at least one selected from the group consisting of $LiPF_6$, $LiBF_4$, $LiN(C_2F_5SO_2)_2$, $LiN(CF_3SO_2)_2$ and $LiCF_3SO_3$ is contained as the electrolytic salt.

13. A non-aqueous electrolyte cell comprising a negative electrode, a positive electrode and a gelated electrolyte; and wherein said gelated electrolyte contains an inorganic compound having a specific inductive capacity not lower than 12;

wherein said inorganic compound exhibits paraelectricity.

14. The non-aqueous electrolyte cell according to claim 13, wherein said negative electrode contains a substance capable of doping/undoping lithium as an active material; and wherein said positive electrode contains a lithium compound oxide as an active material.

15. The non-aqueous electrolyte cell according to claim 13, wherein said non-aqueous electrolyte contains at least one selected from the group consisting of $LiPF_6$, $LiBF_4$, $LiN(C_2F_5SO_2)_2$, $LiN(CF_3SO_2)_2$ and $LiCF_3SO_3$.

16. An electrode for a cell in which an electrode mixture layer containing an active material is formed on a current collector, wherein said electrode mixture layer contains an inorganic compound having a specific inductive capacity not lower than 12;

wherein said inorganic compound exhibits paraelectricity.

17. A non-aqueous electrolyte cell comprising a negative electrode, a positive electrode and a gelated electrode; wherein a layer of an electrode mixture containing an active material is formed on a current collector of at least one of said positive electrode and said negative electrode; said electrode mixture layer containing an inorganic compound having a specific inductive capacity not lower than 12; wherein said inorganic compound exhibits paraelectricity.

18. The non-aqueous electrolyte cell according to claim 17, wherein said negative electrode contains a substance capable of doping/undoping lithium as an active material; and wherein said positive electrode contains a lithium compound oxide as an active material.

* * * * *